US012195972B2

(12) United States Patent
Kahle

(10) Patent No.: US 12,195,972 B2
(45) Date of Patent: Jan. 14, 2025

(54) ICE MELTING ASSEMBLY

(71) Applicant: Clear Industries, Hartford, WI (US)

(72) Inventor: Todd Kahle, Hartford, WI (US)

(73) Assignee: Clear Industries, Hartford, WI (US)

( * ) Notice: Subject to any disclaimer, the term of this patent is extended or adjusted under 35 U.S.C. 154(b) by 184 days.

(21) Appl. No.: 17/376,629

(22) Filed: Jul. 15, 2021

(65) Prior Publication Data

US 2022/0018135 A1 Jan. 20, 2022

Related U.S. Application Data

(60) Provisional application No. 63/052,952, filed on Jul. 16, 2020.

(51) Int. Cl.
*E04D 13/10* (2006.01)
*H05B 3/06* (2006.01)
*H05B 3/56* (2006.01)

(52) U.S. Cl.
CPC ............. *E04D 13/103* (2013.01); *H05B 3/06* (2013.01); *H05B 3/56* (2013.01); *H05B 2214/02* (2013.01)

(58) Field of Classification Search
CPC ... H05B 3/06; H05B 3/56; H05B 3/34; H05B 3/342; H05B 2214/02; H05B 2203/002; E04D 13/10; E04D 13/103; E04D 13/106
See application file for complete search history.

(56) References Cited

U.S. PATENT DOCUMENTS 4,543,474 A * 9/1985 Horsma ................. H01C 7/027
264/105
5,484,983 A * 1/1996 Roell ....................... D04B 1/12
219/545
5,928,548 A * 7/1999 Johansson ................ H05B 3/34
219/217
6,700,098 B1 * 3/2004 Wyatt ..................... E04D 13/08
338/315
2003/0062513 A1 * 4/2003 Henderson ............ B66F 19/005
254/8 R
2004/0250815 A1 * 12/2004 Scott ................. A61M 16/1095
128/204.17
2005/0198917 A1 * 9/2005 Hokkirigawa ........ C04B 35/583
52/173.1

(Continued)

FOREIGN PATENT DOCUMENTS

| | | | |
|---|---|---|---|
| KR | 20060088526 A | * | 8/2016 |
| KR | 101758767 B1 | * | 7/2017 |
| KR | 101946210 B1 | * | 2/2019 |

OTHER PUBLICATIONS

KR-20060088526-A (Kim Do Hoon) Aug. 4, 2016 [retrieved on Aug. 22, 2024]. Retrieved from Espacenet Database, translation by EPO and Google. (Year: 2016).*

(Continued)

*Primary Examiner* — John J Norton
*Assistant Examiner* — Franklin Jefferson Wang
(74) *Attorney, Agent, or Firm* — Quarles & Brady LLP

(57) ABSTRACT

The present disclosure provides a heating device for the removal and/or prevention of ice masses or snow. The heating device can include a heating cable formed in a pattern of loops, arcs, or other shapes. Power can be applied to the heating cable and, when placed on top of an ice mass or within a concrete or asphalt surface, the heating device can melt the ice mass or snow.

22 Claims, 17 Drawing Sheets

(56) References Cited

U.S. PATENT DOCUMENTS

| | | | | |
|---|---|---|---|---|
| 2007/0045279 | A1* | 3/2007 | Emami | H05B 3/66<br>219/461.1 |
| 2012/0195726 | A1* | 8/2012 | Hagenbuch | B66C 1/66<br>414/815 |
| 2014/0097178 | A1* | 4/2014 | Whitcraft | H05B 3/34<br>219/541 |
| 2015/0173127 | A1* | 6/2015 | Kim | H05B 3/283<br>219/540 |
| 2019/0048533 | A1* | 2/2019 | Anthony | H05B 3/34 |
| 2021/0238857 | A1* | 8/2021 | Kuhl | H05B 1/023 |
| 2022/0259863 | A1* | 8/2022 | Rinerson | E04D 13/103 |

OTHER PUBLICATIONS

KR-101946210-B1 (Kim Yeong Chun) Feb. 8, 2019 [retrieved on Aug. 22, 2024]. Retrieved from Espacenet Database, translation by EPO and Google. (Year: 2019).*

KR-101758767-B1 (Lee Hyo Sig) 2017-07-17 [retrieved on Aug. 22, 2024]. Retrieved from Espacenet Database, translation by EPO and Google. (Year: 2017).*

* cited by examiner

ICE MELTING ASSEMBLY

CROSS-REFERENCE TO RELATED APPLICATIONS

The present application is based on, claims priority to, and incorporates herein by reference in its entirety, U.S. Provisional Patent Application No. 63/052,952, filed on Jul. 16, 2020, and entitled "Ice Melting Assembly."

STATEMENT REGARDING FEDERALLY SPONSORED RESEARCH OR DEVELOPMENT

Not applicable.

BACKGROUND OF THE DISCLOSURE

The field of the invention is systems and methods regarding the management, prevention, and removal of ice buildup or ice masses on, among other things, building structures, vehicles, rooftops, and the like. In some cases, the ice buildup or ice masses can be known as "ice dams."

Ice dams typically form around the edges of a roof, around skylights or vents, or in areas where adjacent inclined surfaces of a roof meet (i.e., "valleys"). Ice dams typically form from indoor heat rising through the ceiling of a building or home which warms the roof of the building. This warming from the underside of the roof heats up and melts snow that has built up on the top side of the roof. As the snow melts, the melted snow flows down the roof until it reaches a part of the roof that experiences colder temperatures (i.e., below freezing, typically in the areas noted above). This melted snow begins to freeze in these areas to form ice dams.

Ice dams can cause significant damage to a building structure by way of roof leaks or structural damage. For example, the ice dam can trap water on the roof, which may then create roof leaks due to the ice dam preventing the shedding of the water. In addition, the ice dam can be of significant weight and damage the roof or structures thereon. For example, gutter systems running along roof edges have been known to be damaged by ice dams.

Conventional ice dam removal or prevention methods have several drawbacks. For example, one conventional method of removing an ice dam can be done by way of steam. A steam solution requires application of pressurized steam to the ice dam to melt the ice. This method is inherently unsafe as it requires an individual to climb on a roof. Here, danger is exacerbated in the winter as snow and ice on the roof increase the risk of slipping and falling. This method is also expensive as one would typically have to hire a professional or acquire specialized equipment to implement this method. Further, this method is only capable of removing an ice dam after it's formed and is incapable of preventing ice dams.

Other conventional methods of removing an ice dam may include the use of hand tools. For example, ice picks or chain saws have been used to attempt to clear ice dams. Again, many of these solutions require an individual to climb on a roof which is unsafe. This method is also extremely labor intensive.

Still other conventional methods call for placing salt pucks on ice dams to melt the dams via chemicals. Chemical removal methods can be extremely time consuming and often require numerous salt applications or long periods of time to successfully melt through large ice dams.

One conventional method of preventing ice dams calls for affixing heated cables along the edges of a roof where ice damming occurs. In most cases, this solution calls for cables to be permanently installed onto the surface of a roof of a building structure, typically in a saw tooth pattern, in areas that are susceptible to ice damming. As noted above, this method requires that the cable be permanently affixed to the roof, resulting in a poor appearance. Further, it is well known that this method does not work well once an ice dam forms. In other words, this method is known to work poorly at removing existing ice dams and is better suited for preventing ice dams from occurring in the first place. For example, these cables cannot be used once an ice dam is already formed, or installed after an ice dam is already formed. Further adding to this deficiency, is that this method inherently attempts to melt an ice dam from bottom to top. This inherent deficiency in the design of this method fails to properly melt the ice dam because, as it is affixed to the roof, at some point the ice dam will no longer be in contact with the heated cable and at that point the cables can no longer efficiently apply heat to the ice dam.

Thus, what is needed are systems and methods of removing or preventing ice buildup or ice masses in a safe and effective way. That is, systems and methods of ice mass removal are needed that can safely remove an ice mass that has formed on a roof without requiring a user to climb onto a roof. There is also a need for effective systems and methods of ice mass removal that are more robust and effective than the conventional methods described above.

BRIEF SUMMARY OF THE DISCLOSURE

The present disclosure provides systems and methods that overcome the deficiencies described above.

In one aspect, the present disclosure provides an ice melting device that can a heating cable formed in a patterned arrangement. The patterned arrangement can include a plurality of arcs, where each arc among the plurality of arcs can be coupled to an adjacent arc.

In some aspects, the present disclosure provides an ice melting device that can include a heating cable formed in a patterned arrangement, where the heating cable can have a power density between about 1 W/m to about 100 W/m.

In some aspects, the present disclosure provides a method of using an ice melting device formed by a length of heating cable formed in a patterned arrangement. The method can include raising an ice melting device into a desired position on an ice mass. The method can also include placing the ice melting device onto a top side of the ice mass and applying power to the ice melting device such that the ice melting device descends through the ice mass for removal thereof.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION OF THE DISCLOSURE

Figure 1:
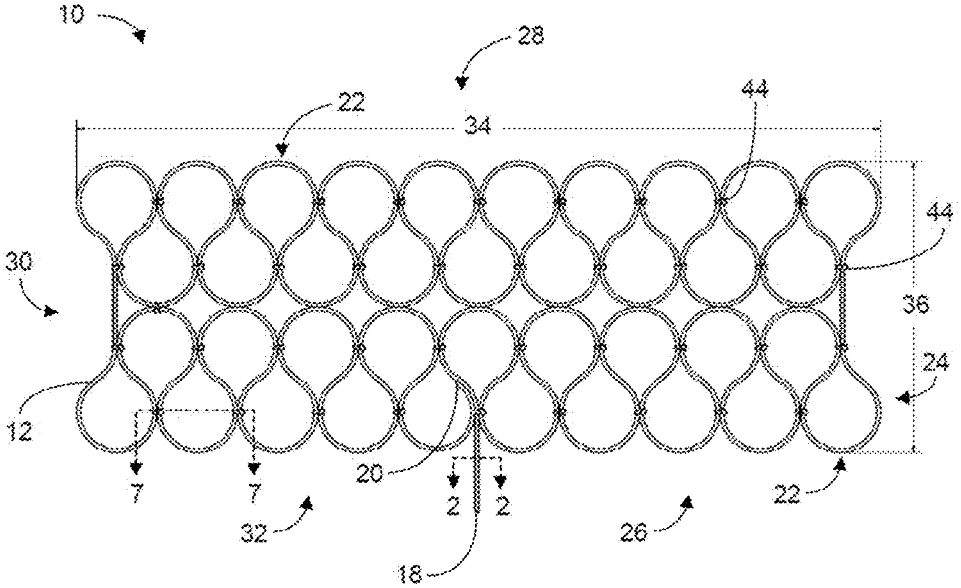
FIG. 1 is a top-down view of an ice melting device according to one aspect of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The word "exemplary" is used herein to mean serving as an example, instance, or illustration. Any aspect or design described herein as "exemplary" is not necessarily to be construed as preferred or advantageous over other aspects or designs.

The words "about" or "approximately" are used herein as equivalents and may be understood to permit standard variation as would be understood by those of ordinary skill in the art. For example, these terms may be applied to one or more values of interest and may refer to a value that is similar to a stated reference value. In certain embodiments, the terms "about" or "approximately" refers to a range of value that fall within 25%, 20%, 15%, 10%, 5%, or less, (or any percentage between 25% and 0%) in either direction (i.e., greater than or less than) the stated reference value unless otherwise stated.

The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

The present disclosure provides an ice melting device for breaching and eventually eliminating an existing ice mass. The ice melting device can be configured to cut the mass of ice into small, manageable pieces that can then easily be removed or that may fall from a roof naturally under force of gravity. The ice melting device can also be sized or configured (e.g., by size, weight, structure, etc.) to allow a user to easily raise it into place on a roof while standing on the ground without having to get on the roof at all. In some configurations, as will be described herein, the present disclosure provides a device placement apparatus, which can be used to allow a user to install the ice melting device onto the roof while the user remains at ground level.

Ice Melting Device

Referring now to FIG. 1, one embodiment of an ice melting device 10 is shown. The ice melting device 10 can include a heating element. In the illustrated non-limiting example, the heating element is in the form of a heating cable 12. The heating cable 12 can be utilized to generate heat when power is applied to the heating cable 12.

Figure 2:
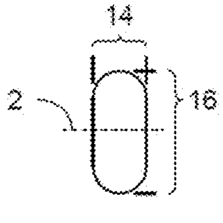
FIG. 2 is an exemplary cross-sectional view of a heating cable of the ice melting device of FIG. 1 taken along line 2-2.

As illustrated in FIG. 1, the heating cable 12 can be flexible. In some non-limiting examples, the heating cable 12 can be formed of a substantially rectangular or pill shaped cross section (FIG. 2). In other non-limiting examples, the heating cable can be of a circular cross section, or some other polygonal shape. In the particularly advantageous embodiment illustrated in FIG. 2, the heating cable can be of a rectangular or pill-shaped cross section which can enable the heating cable 12 to easily bend about the short edge 14 of the rectangular cross section, yet be resistant to bending about the long edge 16 of the rectangular cross section. This can enable the heating cable 12 to be formed or arranged in a pattern by bending the heating cable around the short edge 14 of the rectangular cross section, thereby defining a generally flat and planar structure of ice melting device 10. In addition, due to the orientation of the bent heating cable 12, the long edge 16 of the rectangular cross section of the heating cable 12 would be oriented perpendicular to the plane 2 defined by the ice melting device 10, and thus, enabling the ice melting device 10, when formed into a pattern, to be resistant to bending.

It is to be understood by one of ordinary skill in the art that the heating cable 12 can have many cross-sectional dimensions, and that the cross-sectional dimensions of the heating cable 12 may be determined by a desired stiffness or bendability of the heating cable 12 and/or ice melting device 10. For example, the heating cable 12 can have a short edge 14 (i.e., width) between about 0.1 inches (in) to about 1 in, or more. In some non-limiting examples, the heating cable 12 can have a short edge 14 between about 0.1 in and about 0.5 in. In a particularly advantageous embodiment, the heating cable 12 can have a short edge 14 between about 0.1 in and about 0.3 in.

Similarly, the heating cable 12 can have a long edge 16 (i.e., length) between about 0.2 inches (in) to about 2 in, or more. In some non-limiting examples, the heating cable 12 can have a long edge 16 between about 0.2 in and about 1 in. In a particularly advantageous embodiment, the heating cable 12 can have a long edge 16 between about 0.2 in and about 0.6 in.

As illustrated in FIG. 1, the heating cable 12 can be a single, continuous cable. That is, the ice melting device 10 can be formed from one length of heating cable 12 that extends continuously from a first end 18 to a second end 20, with no breaks therebetween. In some non-limiting examples, the ice melting device 10 can be formed of multiple segments of heating cable, which can be connected together in series using an appropriate connector. For example, at least one of the first end 18 or the second end 20 can have an appropriate connector coupled thereto (i.e., an electrical connector including either a male or female end), which can allow multiple segments of a heating cable 12 to be connected in series.

It is to be understood by one of ordinary skill in the art that the heating cable 12, whether continuous or arranged in series, can have any total length, and that the length of the heating cable 12 may only be limited by the electrical current limitations of a circuit powering the ice melting device 10. For example, the heating cable 12 can have a total length between about 3 feet (ft) to about 1600 ft, or more. In some non-limiting examples, the heating cable 12 can have a total length between about 16 ft and about 330 ft. In a particularly advantageous embodiment, the heating cable 12 can have a total length between about 30 ft and about 160 ft.

In the illustrated non-limiting example, the heating cable 12 can be formed into a patterned arrangement. For example, the heating cable 12 can be arranged in a "teardrop" shaped pattern. The teardrop pattern can be formed by a repeating series of alternating clockwise and counter-clockwise arcs 22. As shown in FIG. 1, the plurality of arcs 22 can define a two-dimensional array of alternating teardrop shapes forming a generally planar ice melting device 10. For example, the pattern of arcs may begin near the first end 18 of the heating cable 12 and a first arc can be formed in a clockwise direction. Continuing to follow the heating cable 12, a second arc can be formed in a counter-clockwise direction such that the second arc mirrors the shape or form of the first arc.

This process of alternating clockwise and counter-clockwise arcs 22 may continue several times towards a first edge 24 until a desired length is achieved, thereby defining a first portion 26 of the ice melting device 10. To achieve a desired width, the pattern may be repeated to form a second portion 28. In the illustrated non-limiting example, the second portion 28 can mirror the first portion 26. The pattern of alternating clockwise and counter-clockwise arcs 22 may continue several times from the first edge 24 towards a second edge 30 until a desired length is achieved. To complete the generally rectangular form of the device, a third portion 32 of the device may continue pattern of alternating clockwise and counter-clockwise arcs 22 from the second edge 30 toward the first edge 24, terminating at the second end 20 of the heating cable 12 proximate to the first arc. In the illustrated non-limiting example, the third portion 32 can mirror the second portion 28. In other words, the first portion 26 and the third portion 32 can combine to form a total length of the ice meting device 10 and the second portion 28 can be equal to the total length of the ice melting device 10 and mirror the first and second portions 26, 32.

One of ordinary skill in the art will recognize that a pattern of arcs can continually be repeated to form an ice melting device 10 of any desired total length 34. For example, the ice melting device 10 can have a total length 34 between about 1 ft to about 100 ft, or more. In some non-limiting examples, the ice melting device 10 can have a total length 34 between about 1 ft and about 25 ft. In a particularly advantageous embodiment, the ice melting device 10 can have a total length 34 between about 1 ft and about 15 ft.

One of ordinary skill in the art will recognize that a pattern of arcs can continually be repeated to form an ice melting device 10 of any desired total width 36. For example, the ice melting device 10 can have a total width 36 between about 0.2 ft to about 50 ft, or more. In some non-limiting examples, the ice melting device 10 can have a total width 36 between about 0.2 ft and about 15 ft. In a particularly advantageous embodiment, the ice melting device 10 can have a total width 36 between about 0.2 ft and about 5 ft.

In some non-limiting examples, the ice melting device can be sized or configured to be utilized in a gutter or water draining system for a roof or building structure. For example, the ice melting device can be dimensioned to be received within a gutter that may run along the edge of a roof. In such an arrangement, the total width 36 can be between about 2 in and about 8 in. In a particularly advantageous embodiment, the total width 36 can be between about 2 in and about 5 in. The reduced total width 36 can allow for the ice melting device to be placed onto an ice mass that has formed over a gutter and, when melting through the ice mass, be received within the gutter to eventually rest at a base or bottom of the gutter. In such an arrangement, the total length 34 can be between about 2 ft and about 20 ft. In a particularly advantageous embodiment, the total length 34 can be between about 7 ft and about 10 ft. It is to be understood by one of ordinary skill in the art that the ice melting device, in an arrangement for use in a gutter, may only have a single "row" of arcs (e.g., a single row of teardrop shaped loops) or may have multiple rows of arcs.

In the non-limiting example illustrated in FIG. 1, the ice melting device 10 is substantially flat (planar) and generally rectangular in shape, although other configurations are readily contemplated by one of ordinary skill in the art. For example, the ice melting device can be L-shaped or formed into some other angular bend to be received within or on top of a peak or valley, or some other uneven surface on a roof or building structure. In other non-limiting examples, the ice melting device may be configured to surround a vent or opening (e.g., a skylight) on top of a roof or building structure to prevent ice mass formations there around.

Figure 3:
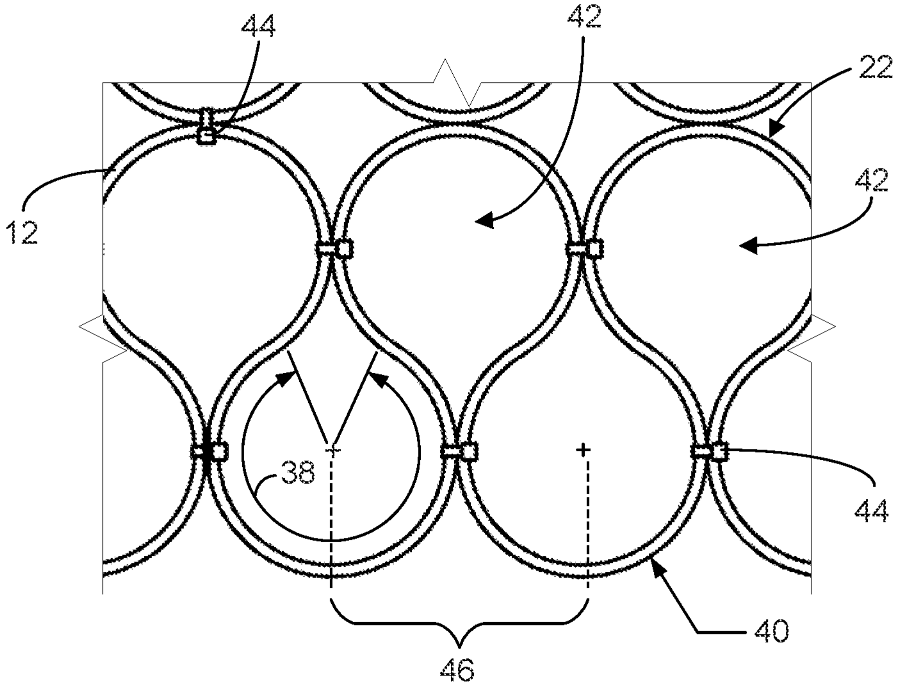
FIG. 3 is a detail view of a patterned arrangement of the heating cable of the ice melting device of FIG. 1.

Referring now to FIG. 3, the arrangement of alternating arcs (in this case, arcs forming a teardrop-shaped pattern) can allow for each arc 22 to contact an adjacent arc 22. For example, the patterned arrangement of the ice melting device 10 can include a plurality of arcs 22. Each arc 22 among the plurality of arcs 22 can be in contact with at least one other arc 22. In some non-limiting examples, an arc 22 can be in contact with one or more arcs 22 (in some cases, two or more arcs 22).

In the illustrated non-limiting example, the arcs 22 that form the patterned arrangement of the ice melting device 10 can maintain an approximately constant radius for at least a portion of the curvature of the arc 22. The amount of curvature that has a constant radius for each arc 22 can impact the flexibility or stiffness of the ice melting device. For example, the arcs 22 of the ice melting device 10 can have an approximately constant radius 38 between about 90° of curvature to about 350° of curvature, or more. In some non-limiting examples, the arcs 22 of the ice melting device 10 can have an approximately constant radius 38 between about 180° of curvature to about 350° of curvature. In a particularly advantageous embodiment, the arcs 22 of the ice melting device 10 can have an approximately constant radius 38 between about 260° of curvature to about 320° of curvature.

Similarly, the radius 40 of the arcs 22 can be varied depending on a desired stiffness or flexibility (i.e., rigidity) of the ice melting device 10. For example, the ice melting device 10 may be more resistant to bending (e.g., in the plane defined by the ice melting device) as the radius 40 of the arcs 22 is decreased. Conversely, the ice melting device 10 may be more flexible as the radius 40 of the arcs 22 in increased. As such, a stiffness or flexibility of the ice melting device 10 can be varied depending on a desired application. For example, the arcs 22 in the heating cable 12 can have a radius 40 between about 1 in to about 15 in, or more. In some non-limiting examples, the arcs 22 in the heating cable 12 can have a radius 40 between about 1 in and about 10 in. In a particularly advantageous embodiment, the arcs 22 in the heating cable 12 can have a radius 40 between about 1.5 in and about 5 in.

In some non-limiting examples the ice melting device 10 could be configured to be flexible enough to maintain contact with an ice mass as it melts. In another non-limiting example, in some applications the ice melting device 10 could be configured to be flexible enough to maintain contact with an uneven roof, building structure (e.g., a roof with "peaks" or "valleys"), or formed ice mass on top of a roof structure. In some non-limiting examples, the ice melting device 10 may be flexible enough to be rolled up for shipping or storage.

In addition, as the radius of the arcs 22 is decreased, the number of arcs 22 (or teardrops) in a given area is increased. As such, the energy density or heating power of the cable increases as the radius of the arcs decreases. For example, the arcs 22 or teardrop shapes can define arced heating sections 42. In the illustrated non-limiting example, the arced heating sections 42 can be formed to enable a tight packing between adjacent arced heating sections 42. In some non-limiting examples, adjacent arced heating sections 42 can be complementarily shaped to reduce any gaps therebetween. In the illustrated non-limiting examples, the arced heating sections 42 can be formed in an alternating pattern of teardrop shapes. The ice melting device 10 can have between about 1 arced heating sections per square foot to about 50 arced heating sections per square foot, or more. In some non-limiting examples, the ice melting device 10 can have between about 5 arced heating sections per square foot to about 25 arced heating sections per square foot. In a particularly advantageous embodiment, the ice melting device 10 can have between about 5 arced heating sections per square foot to about 15 arced heating sections per square foot.

The energy density or heating power of the cable may also increase dependent upon a distance 46 between adjacent arced heating sections 42. For example, the adjacent arced heating sections 42 can be separated by a distance 46 between about 2 in to about 30 in, or more. In some non-limiting examples, the adjacent arced heating sections 42 can be separated by a distance 46 between about 2 in and about 20 in. In a particularly advantageous embodiment, the adjacent arced heating sections 42 can be separated by a distance 46 between about 3 in and about 10 in.

The ice melting device 10 can also include fasteners 44 configured to enable the ice melting device 10 to maintain the patterned arrangement of the heating cable 12. In the illustrated non-limiting example, the ice melting device 10 can include a plurality of fasteners 44. The fasteners 44 can be configured to couple arcs 22 that are adjacent to one another. For example, an arc 22 can be coupled to an adjacent arc 22 with at least one fastener 44. In some non-limiting examples, an arc 22 can be coupled to multiple adjacent arcs 22 via two or more fasteners (i.e., at least one fastener 44 per adjacent arc 22). In the illustrated non-limiting example, the fasteners 44 can be circumferentially separated along the arc 22. For example, a fastener 44 on an arc 22 may be circumferentially separated along the arc 22 by about 90° or about 180° (or in a range between about 90° to about 180°).

In the illustrating non-limiting example, the fasteners 44 can be in the form of cable ties. The cable ties may be formed of a metal, a copper wire, or some other thermally conductive material, such that the cable tie can promote heat transfer to the ice mass. Alternatively, the cable ties may be formed of a plastic cable tie (e.g., a "zip tie"). Although other suitable fastening devices may be used. The fasteners 44 provide a structure to the ice melting device by tying together or coupling adjacent arcs 22, which in turn help the ice melting device 10 maintain a patterned arrangement, and additionally, increase the stiffness or rigidity of the ice melting device 10. Due to the rigidity provided by the heating cable 12 cross section and the fasteners 44, the ice melting device 10 may not require any secondary framework or structure. For example, the ice melting device 10 can be that of a "frameless" design or a frameless configuration. In such a frameless configuration, the ice melting device 10 may not require a metal or rigid structure to allow the ice melting device 10 to maintain its shape or patterned arrangement.

In some non-limiting examples, the heating cable 12 can be configured to operate at about 65° C. (i.e., about 149° F.). Although the heating cable 12 can be configured to operate at other temperatures as well. For example, the heating cable 12 can be configured to operate between about 35° C. and about 85° C. (i.e., between about 95° F. and about 185° F.).

Figure 4:
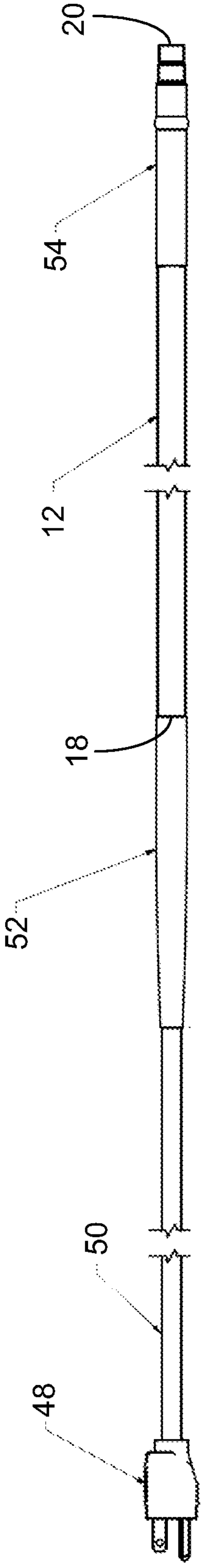
FIG. 4 is an exemplary schematic of a heating cable used to form an ice melting device according to some aspects of the present disclosure.

As illustrated in FIG. 4, the ice melting device 10 can also be configured to receive power readily available in household application. For example, the heating cable 12 may receive 110-120 VAC power from a common household electrical outlet. Although the heating cable 12 could also be configured to be powered by or user other voltages as well (e.g., 220-240 VAC, two-phase power, or three-phase power, etc.). In the illustrated non-limiting example, the ice melting device 10 can include an electrical plug 48 in electrical communication with the first end 18 of the heating cable 12. For example, a NEMA 5-15 connector, or others, dependent on the country or region of use, or intended power to be received by the ice melting device 10. In some non-limiting examples, the plug 48 may be coupled to a "cold" lead 50 that is coupled to the first end 18 of the heating cable 12. The lead 50 may be in the form of a standard, non-heated electrical wire that may extend the range or distance from an electrical source that the ice melting device 10 may be used. It is to be understood by one of ordinary skill in the art that the lead 50 can have a length between about 3 ft to about 100 ft, or more. The length of the lead 50 can be dependent on an application, or be extended when used in conjunction with, for example, an extension cord.

The lead 50 may be coupled to the first end 18 of the heating cable 12 via a sealed connection 52. The sealed connection 52 may prevent water ingress or corrosion on the connection between the lead 50 and the heating cable 12. Similarly, the second end 20 of the heating cable 12 can be capped with a sealed end cap 54. The sealed end cap 54 may prevent water ingress or corrosion into the heating cable 12.

In some non-limiting examples, the heating cable 12 can be a self-regulating heating cable. For example, the heating cable 12 may be configured to maintain a predetermined operating temperature by varying the power (i.e., wattage) running through the heating cable 12. For example, the predetermined operating temperature maintained by a self-regulating heating cable can be about 65° C. or 149° F., or the other operating temperatures, or range thereof, previously described herein. In one non-limiting example, as the heating cable 12 cools, as it may when in contact with ice or a cold surface, the self-regulating cable may increase the power delivered to the cable. Conversely, as the heating cable 12 warms, the self-regulating cable may decrease the power delivered to the cable. In that way, the temperature of the heating cable 12 can be managed by the fluctuation of the power thereto (e.g., by varying the wattage in the heating element), which in turn, increases or decreases the temperature of the heating cable 12. The self-regulating feature of the heating cable 12 can eliminate the need for an external thermostat or temperature controller.

Figure 5:
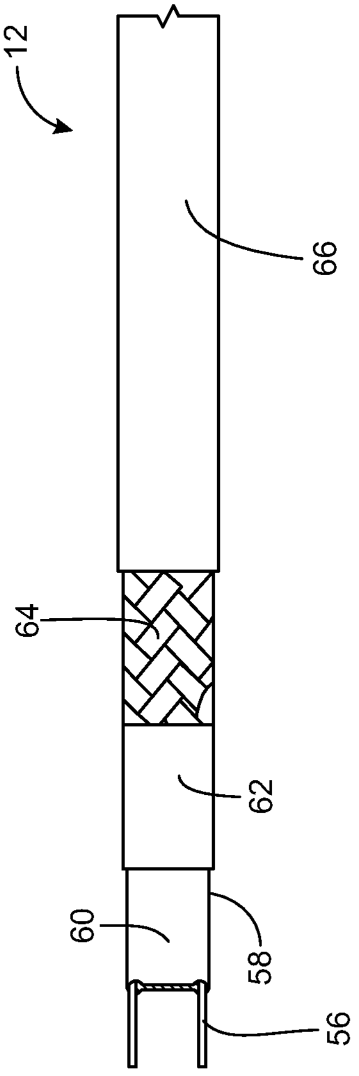
FIG. 5 is an exploded view of a heating cable according to some aspects of the present disclosure.

Referring now towards FIG. 5, the self-regulating heating cable can include a set of parallel bus wires 56. The parallel bus wires 56 can be formed from tinned copper bus wires. In some non-limiting examples, the gauge of the parallel bus wires 56 can be 16 AWG, although other gauges are also possible. For example, the gauge of the parallel bus wires 56 can be between 8 AWG to 22 AWG, or more or less than the range of 10 AWG to 20 AWG. The parallel bus wires 56 can be sheathed a self-regulating conductive core 58. The conductive core 58 can surround each of the parallel bus wires 56 and form a web 60 therebetween. The conductive core 58 can allow the transfer of electrical energy between the parallel bus wires 56. The material of the conductive core 58 can also allow for the temperature produced by the heating cable 12 to vary with ambient conditions (e.g., the temperature of the materials in contact with the heating cable 12). For example, different temperatures can be produced at different areas along the heating cable 12, caused by local temperature changes along the length of the heating cable 12.

The conductive core 58 can be sheathed in a first layer 62. The first layer 62 can be an insulating layer comprised of an insulating material. For example, the first layer 62 can be made from a thermoplastic insulation material. In the illustrated non-limiting example, the heating cable 12 can include additional layers of sheathing. For example, the heating cable 12 can include a second layer 64 sheathing the first layer 62. The second layer 64 can comprise a braded material. For example, the second layer 64 can be made from a tinned copper braided material, or some other thermally conductive braided material. In some non-limiting examples, the heating cable 12 can include a third layer 66. The third layer 66 can be the outermost layer of the heating cable 12. The third layer 66 can be made from a fluoropolymer or a thermoplastic material. The multiple layers of the heating cable 12 can provide electrical, chemical, liquid, weather, and mechanical protection for the heating cable 12. It is to be understood by one of ordinary skill in the art that the labels first, second, and third do not imply any particular order in which the heating cable layers must be arranged. In addition, the heating cable 12 may or may not include one or more of the layers listed above. In some non-limiting examples, the heating cable 12 can comprise a standard sheathed electrical wire (e.g., a sheathed copper wire) and may be non-self-regulating.

Figure 6:
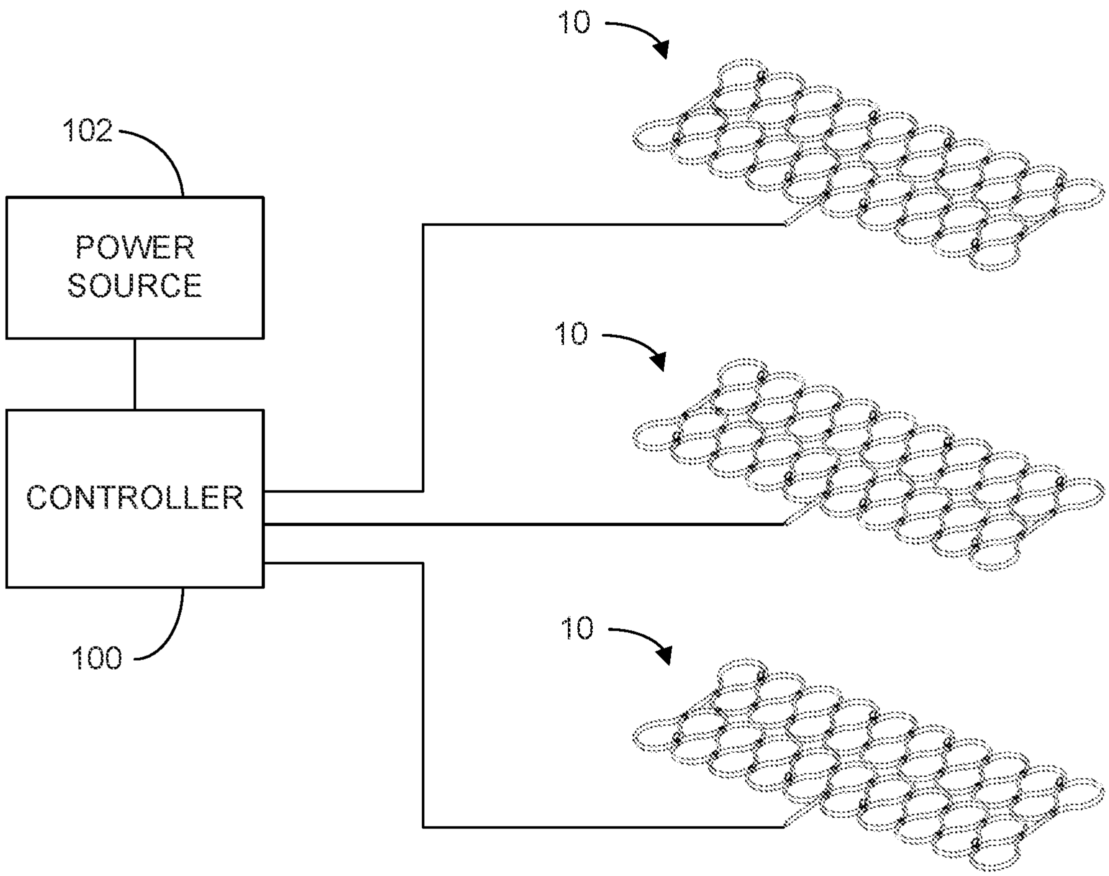
FIG. 6 is an exemplary schematic of a control system for an ice melting device according to some aspects of the present disclosure.

In the illustrated non-limiting example shown in FIG. 6, a controller 100 can be in electrical communication with one or more the ice melting devices 10 that controls the heating or temperature of the heating cable 12. In some configurations, the controller 100 can be internal to the heating cable 12, or form a part of the heating cable 12. In other non-limiting examples, the controller 100 can be external to the heating cables 12, which may then be connected in series or in parallel. The controller 100 can also be in electrical communication with a power source 102. The controller 100 can be configured to regulate the operating temperature of the one or more ice melting devices 10 by varying a power delivered to the heating cable 12. For example, the controller 100 can be in electrical communication with the heating cables 12 to control the power delivered thereto and adjust the power based on a sensed operating temperature (e.g., via an external temperature sensor or by directly sensing the temperature of the heating cable 12). The controller 100 can also be configured to selectively or variably deliver the power to one or more of the ice melting devices 10. The selective power delivery can be based on determining if the ice melting device has come in contact with a roof or building structure (i.e., after having melted through the ice). In other non-limiting examples, the selective power delivery can be based on a desired energy output or energy usage.

In some non-limiting examples, the controller 100 can also include a timer, a temperature sensor, and/or a snow sensor to enable better control of the one or more ice melting devices 10. For example, the controller 100 can power the one or more ice melting devices 10 for a predetermined period of time. In some non-limiting examples the controller 100 can sequentially power individual ice melting devices 10 for a predetermined period of time. In other non-limiting examples the controller 100 can be user programmable to power the ice melting devices 10 for a predetermined period of time.

In configurations where the controller 100 includes a temperature sensor, the controller 100 can detect an ambient temperature. The controller 100 may use the sensed ambient temperature to determine how long the ice melting devices should be powered. In some non-limiting examples, the controller 100 can power the ice melting devices 10 if the ambient temperature drops below a predetermined temperature. In configurations where the controller 100 includes a snow sensor, the controller 100 can be configured to detect snow. In response to detecting snow the controller 100 can power the one or more ice melting devices 10 to prevent the formation of ice masses.

In some non-limiting examples, the heating cable 12 can be configured to output a nominal power density (i.e., wattage per unit length). For example, the heating cable 12 can nominally output between about 1 W/m to about 100 W/m, or more. In some non-limiting examples, the heating cable 12 can nominally output between about 10 W/m to about 80 W/m. In a particularly advantageous embodiment, the heating cable 12 can nominally output between about 20 W/m to about 50 W/m.

As will be described herein, the patterned arrangement can enable the heating cable 12 of the ice melting device 10 to cut channels in an ice mass when the ice melting device 10 is placed on the ice mass. In that way, the heating cable 12 may melt through the ice mass from top to bottom. By melting the ice mass from top to bottom, the heating cable 12 of the ice melting device 10 may maintain constant contact with the ice mass. For example, the weight of the ice melting device 10 may advantageously allow the heating cable 12 to push down (under force of gravity) into the channels cut in the ice mass. In addition, the channels formed by the heating cable 12 can allow for dammed water trapped behind the ice mass to flow down and off the roof.

Figure 7:
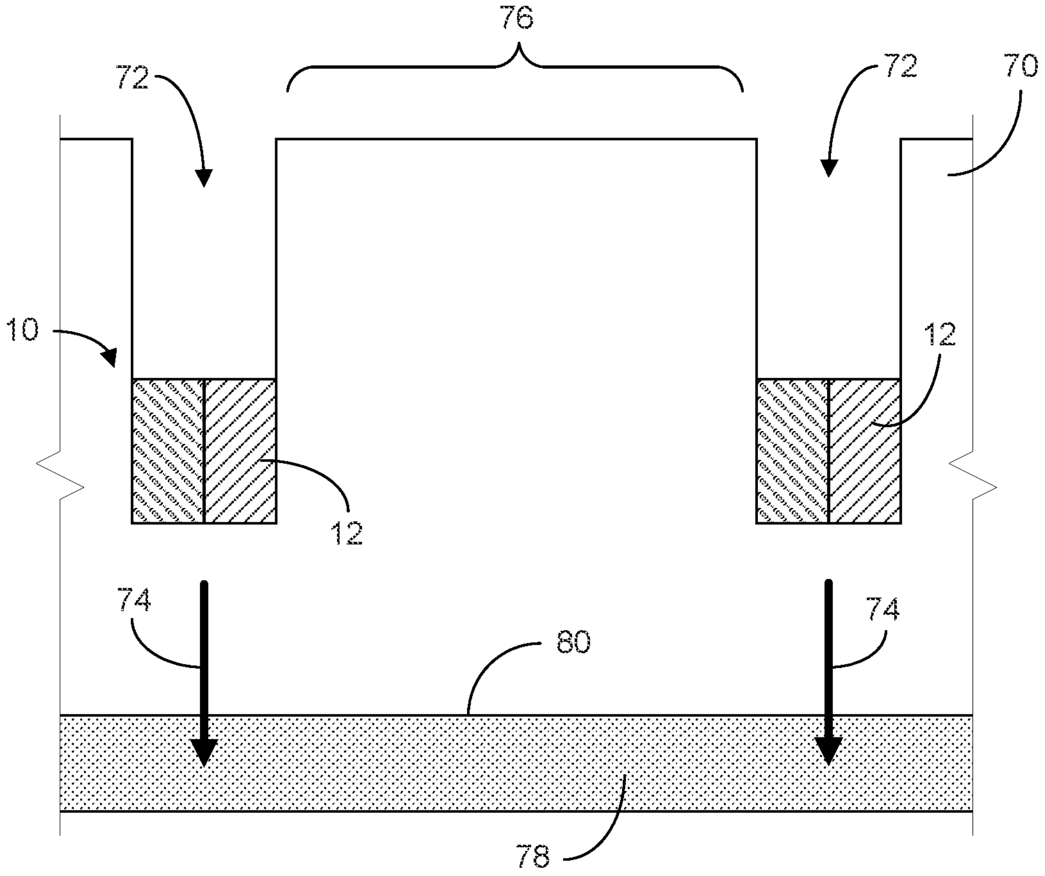
FIG. 7 is an exemplary cross-sectional view of the ice melting device of FIG. 1 taken along line 7-7 with the ice melting device partly melted through an ice mass.

Referring now to FIG. 7, during operation, the ice melting device 10 may be placed on top of an ice mass 70. Once the ice melting device 10 is in place, power can be applied to the ice melting device 10 to begin heating the heating cable 12. The heating cable 12 will then heat and begin to form or melt channels 72 in the ice mass 70 as the heating cables 12 move downwards (illustrated by arrows 74). The formation of the channels 72 in the ice mass 70 can form ice columns 76. The ice columns 76 formed by the heating cables 12 can define substantially the same shape as the patterned arrangement of arcs in the heating cables 12. In other words, the heating cable 12 may form, by using the ice melting device illustrated in FIG. 1, teardrop shaped ice columns 76 as the heating cables 12 melt down through the ice mass 70.

For example, the ice columns 76 formed by the ice melting device 10 can be between about 2 in wide to about 30 in wide, or more (i.e., in the dimension illustrated by bracket 76). In some non-limiting examples, the ice columns 76 formed by the ice melting device 10 can be between about 2 in wide and about 20 in wide. In a particularly advantageous embodiment, the ice columns 76 formed by the ice melting device 10 can be between about 2 in wide and about 10 in wide.

Figure 8:
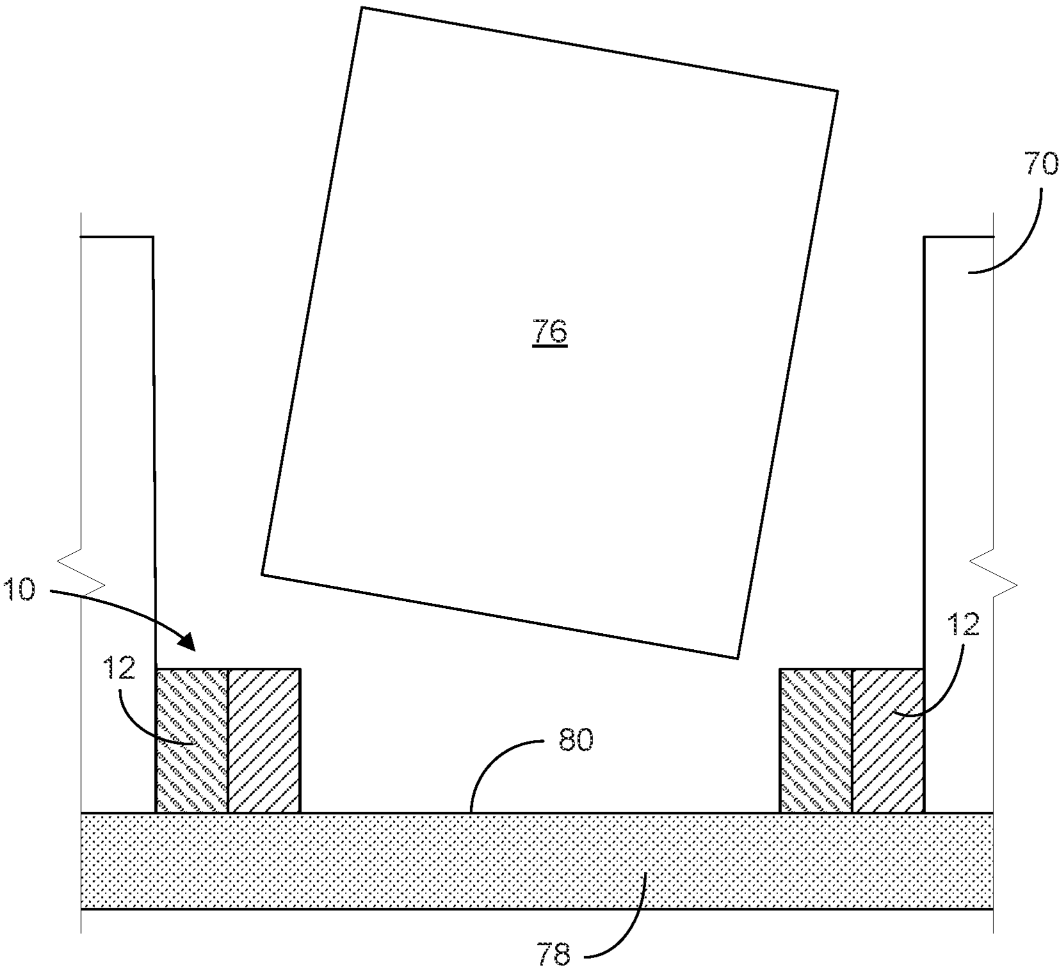
FIG. 8 is another exemplary cross-sectional view of the ice melting device of FIG. 1 taken along line 7-7 with the ice melting device fully melted through an ice mass.

The ice melting device 10 will continue to move downwards and melt through the ice mass 70 until the heating cables 12 meet a surface of the roof 78. When the ice melting device 10 makes contact with the surface of the roof 78, the heating cables 12 may then continue to provide heat to melt the ice-to-roof interface 80. As best illustrated in FIG. 8, once the heating cables 12 have provided sufficient energy to heat the ice-to-roof interface 80, the ice column 76 may become separated from the surface of the roof 78. When the ice column 76 has become separated, the ice column 76 may be easily removed (e.g., manually or by falling to the ground under the force of gravity).

As previously described herein, the radius of the arcs 22 and/or the power density of the heating cable 12 can be adjusted, which in turn may enable the cable to deliver a larger amount of energy to a given area of the roof 78 or ice mass 70 (e.g., larger energy density). In addition, as the radius of the arcs 22 decrease, the size of the ice column 76, and therefore the area of the ice-to-roof interface 80, also decreases, which should enable the ice columns 76 to be more easily removed.

In addition, the additional or increased power density may allow the ice melting device 10 to melt through an ice mass 70 as an increased rate (e.g., a rate of descent as shown by arrows 74). For example, the ice melting device 10 may melt through the ice mass 70 at a rate between about 0.5 inches per hour to about 5 inches per hour, or more. In a particularly advantageous embodiment, ice melting device 10 may melt through the ice mass 70 at a rate between about 2 inches per hour to about 5 inches per hour.

Figure 9:
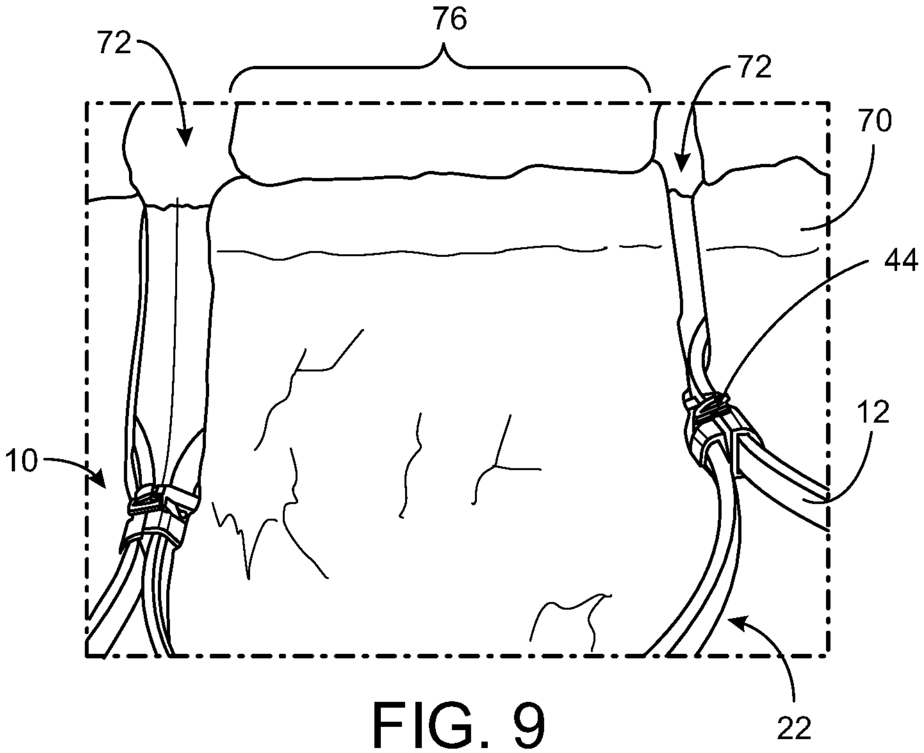
FIG. 9 illustrates an ice melting device descending into an ice mass.
Figure 10:
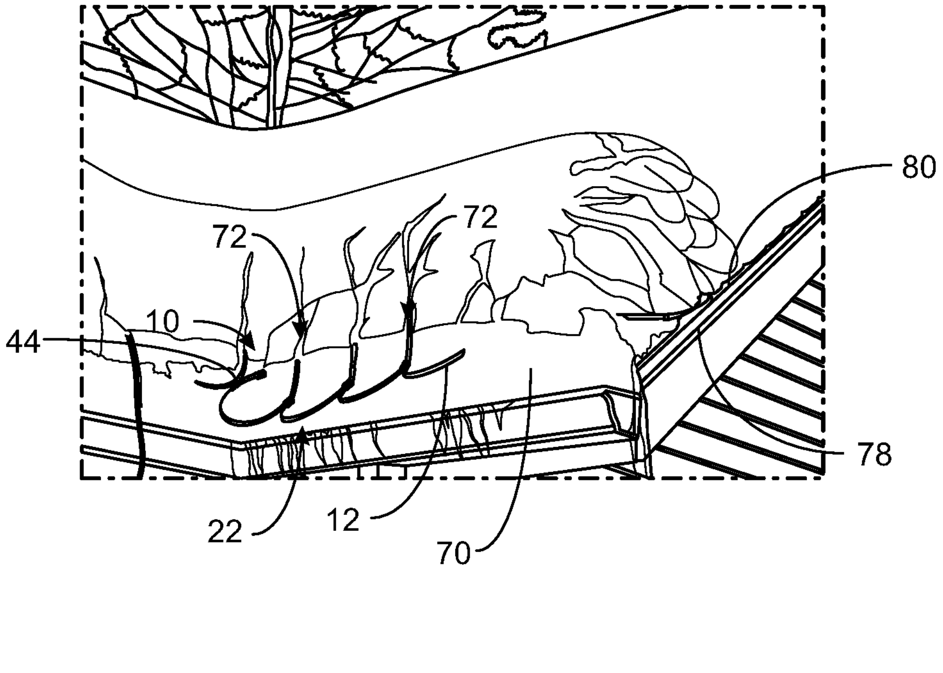
FIG. 10 illustrates an ice melting device descending into an ice mass on a roof.

Illustrated in FIG. 9, a photograph the ice melting device 10 forming ice columns 76 and channels 72 in a snow-covered ice mass 70 is shown. In the illustrated non-limiting example, the channels 72 formed into the ice mass 70 can follow a path generally defined by the patterned arrangement of the arcs 22 of the heating cable 12. Illustrated in FIG. 10, a photograph of an ice melting device installed onto a roof 78 of a structure is shown. Particularly, the flexibility of the ice melting device 10 is shown. In the illustrated non-limiting example, the ice melting device 10 can conform to the ice mass 70 and roof 78 along the length and/or width of the ice melting device 10 such that the ice melting device 10 maintains contact with the ice mass 70 and/or the roof 78.

Ice Melting Kit

Figure 11:
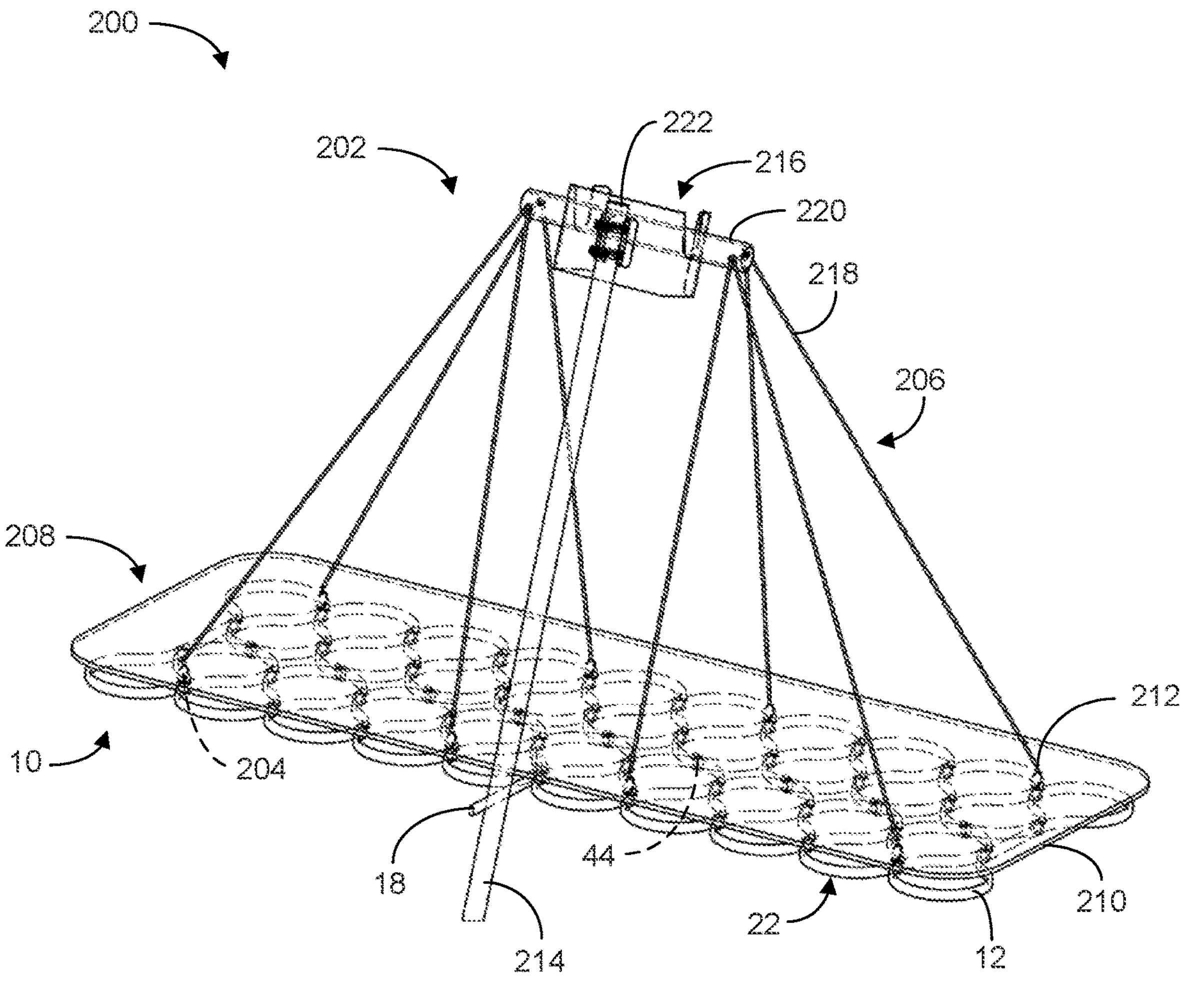
FIG. 11 is a perspective view of an ice melting kit with a device placement apparatus according to one aspect of the present disclosure.

In general, the ice melting device 10 may be placed onto an ice mass manually by a user or installer. However, in some instances where an ice mass is not easily reached by a user, or where it may be unsafe for a user to manually install the ice melting device 10, a device used to position the ice melting device 10 is provided. Referring now to FIG. 11, the ice melting device 10 can be included in an ice melting kit 200. The ice melting kit 200 can include the ice melting device 10 and a device placement apparatus 202. As will be described herein, the device placement apparatus 202 can be used for installation of the ice melting device 10.

Figure 12:
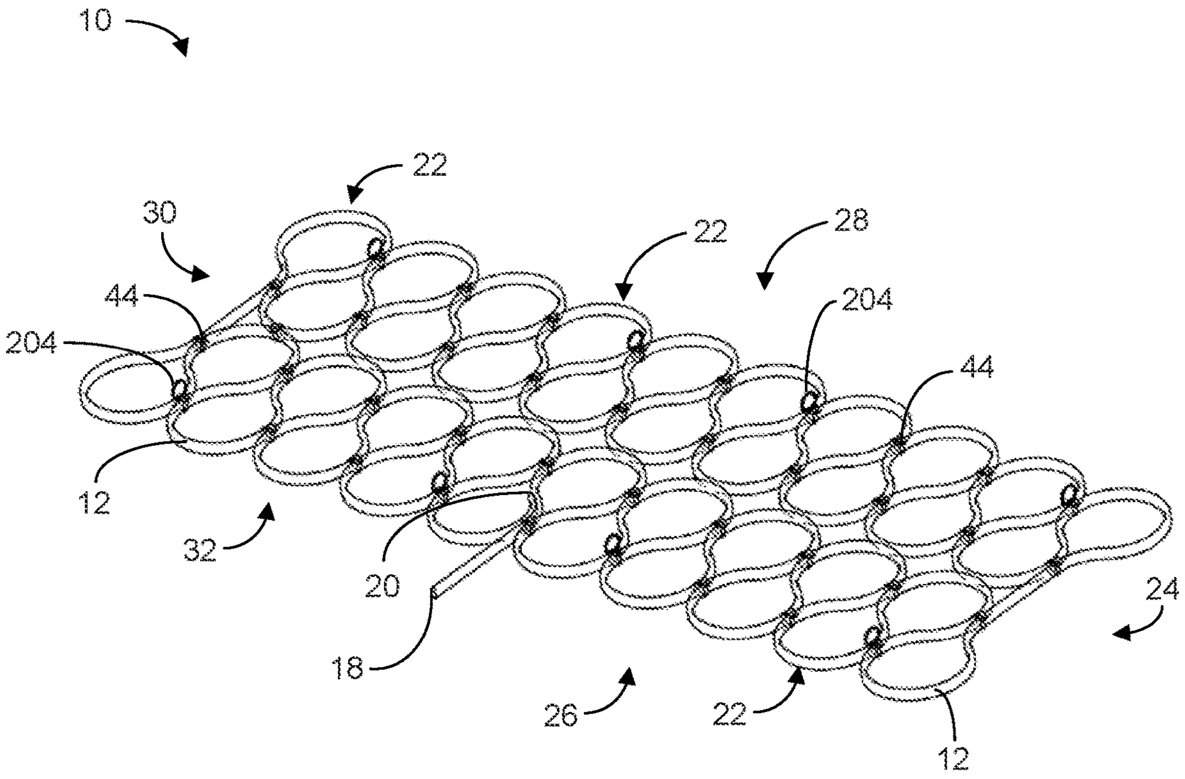
FIG. 12 is a perspective view of an ice melting device included in the ice melting kit of FIG. 11.

In the illustrated non-limiting example, the ice melting device 10, when utilized in conjunction with the device placement apparatus 202, can also include a plurality of eyelets 204 (see also, FIG. 12). The eyelets 204 can be coupled to the fasteners 44 or proximate to the fasteners 44 along the heating cable 12. Alternatively, the eyelets 204 can be coupled directly to the heating cable 12. The device placement apparatus 202 can also include a harness 206. The eyelets 204 can receive, or be coupled to, the harness 206 to assist in lowering the ice melting device 10 onto a roof, building structure, or ice mass that may be generally out of reach of a user or installer of the ice melting device 10.

Referring still to FIG. 11, some non-limiting examples of the present disclosure may utilize an insulating layer. In the illustrated non-limiting example, the insulating layer may be in the form of an insulating blanket 208. The insulating blanket 208 can define a generally flat or planar profile and be dimensioned to be approximately the same size (e.g., length and width) as the ice melting device 10. During operation, the insulating blanket 208 could be positioned above the ice melting device 10 (e.g., adjacent to a top side of the ice melting device 10, from the perspective of FIG. 11). In the illustrated non-limiting example, the insulating blanket 208 may generally be approximately the same dimensions as the ice melting device 10. In other non-limiting examples, the insulating blanket 208 can be larger than the ice melting device 10. For example, an edge 210 of the insulating blanket 208 may extend between about 0.5 in to about 10 in beyond the periphery of the ice melting device 10. In some non-limiting examples, the edge 210 of the insulating blanket 208 may extend between about 0.5 in to about 5 in beyond the periphery of the ice melting device 10. In particularly advantageous embodiment, the edge 210 of the insulating blanket 208 may extend between about 0.5 in to about 2 in beyond the periphery of the ice melting device 10.

When the ice melting device 10 is use in conjunction with the insulating blanket 208, the insulating blanket 208 can be in contact with the dam and may "seal" in the heat produced by the heating cable 12. This insulating effect may decrease the time to breach the ice mass. In other words, the insulating blanket 208 may allow the ice melting device 10 to quickly melt through or descend into the ice mass to more rapidly reach the surface of a roof or structure. In one non limiting example, the insulating blanket may use of an infrared reflective coating on the underside of the insulating blanket 208 (i.e., the side facing the ice mass). Such a coating may improve the thermal reflectivity of the insulating blanket 208, and thereby improve the heating efficiency of the ice melting device.

In some non-limiting examples, colors or coatings on the top side of the insulating blanket 208 (i.e., the side facing away from the ice mass) may be utilized. For example, the top side of the insulating blanket 208 can be black in color. In other non-limiting examples, the top side of the insulating blanket 208 can have a mirrored or shiny appearance. These colors or coatings may improve absorption of solar radiation, and thereby improve the heating efficiency of the ice melting device.

In some non-limiting examples, a solar cell (e.g., photovoltaic panel or flexible solar cell/panel) can be arranged on a top side of the insulating blanket 208. For example, a solar cell can form the top layer of the insulating blanket 208 (e.g., facing away from the ice mass). The solar cell may then be used to provide power to the heating cable 12. In such an embodiment, the ice melting device 10 can be "self-contained" and could be utilized in austere or remote environments where access to grid power may not be readily available.

Figure 13:
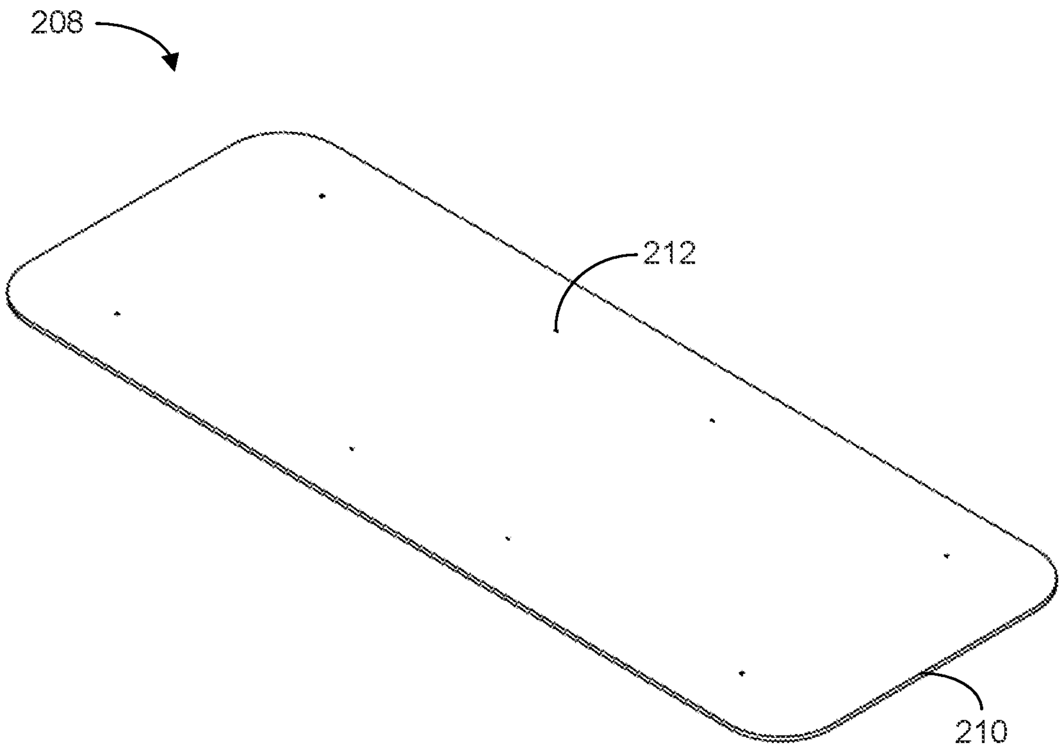
FIG. 13 is a perspective view of an insulating layer included in the ice melting kit of FIG. 11.

The insulating blanket 208 may also include a plurality of holes 212 arranged on the blanket (see FIG. 13). As will be described herein, the holes 212 can be sized to receive a cable, harness, or fastener therethrough. In some non-limiting examples, the insulating blanket 208 could be directly coupled to the ice melting device 10. For example, by any suitable fastening device or the like, which may utilize the holes 212 in the insulating blanket 208. In some non-limiting examples, each of the holes 212 in the insulating blanket 208 may correspond to a eyelet 204 on the ice melting device 10 and a fastener can be used to couple the eyelet 204 of the ice melting device to the hole 212 in the insulating blanket 208, thereby coupling the insulating blanket 208 to the ice melting device 10. With the insulating blanket 208 coupled to the ice melting device 10, the insulating blanket 208 may enable the entire ice mass to be melted as the heating cables 12 descend through the ice mass.

Alternatively, cables of a harness 206 (see FIG. 11) may be slidably received in the holes 212 of the insulating blanket 208 such that the cables may pass through the insulating blanket 208. In such an embodiment, the insulating blanket 208 could slide on the cables relative to the ice melting device 10, thereby allowing the heating cables 12 to descend through the dam while allowing the insulating blanket 208 to remain on a top surface of the ice mass.

When the insulating blanket 208 is utilized in conjunction with the ice melting device 10, the insulating blanket 208 may need to be of sufficient weight to maintain a positioning on a roof during windy conditions. In some non-limiting examples, the insulating blanket 208 may be made from a heavy or thick material.

For example, the insulating blanket 208 can weigh between about 2 oz per square ft to about 40 oz per square ft, or more. In some non-limiting examples, the insulating blanket 208 can weigh between about 2 oz per square ft to about 20 oz per square ft. In a particularly advantageous embodiment, the insulating blanket 208 can weigh between about 2 oz per square ft to about 10 oz per square ft.

Additionally, the insulating blanket 208 can be between about 0.1 in thick to about 1 in thick, or more. In some non-limiting examples, the insulating blanket 208 can be between about 0.1 in thick and about 0.5 in thick. In a particularly advantageous embodiment, the insulating blanket 208 can be between about 0.1 in thick and about 0.4 in thick.

In some non-limiting examples, heavy materials such as EPDM closed cell foam could be used to form the insulating blanket 208. In other non-limiting examples, weight could be added to the insulating blanket 208. For example, the insulating blanket 208 could be formed from a polyethylene plastic sheet material including a myriad of insulating bubbles (e.g., such as those traditionally used as pool covers) could be used, but is relatively light. Thus, weight may need to be added on top of the insulating blanket 208, or included within the insulating blanket 208, to help maintain positioning on a roof.

In yet further non-limiting examples, the insulating blanket could be anchored to the ice melting device 10 using a friction design between the cables of a harness and the holes 212 in the insulating blanket 208. For example, a friction design may require that the holes 212 in the insulating blanket 208 be smaller than a diameter of the cable received therethrough. Thus, as the ice melting device 10 descends through the ice mass, the friction between the cables of a harness and the holes 212 may apply a downward force onto the insulating blanket 208 to maintain a positioning on a roof.

In other non-limiting examples, the insulating blanket can include grip elements (not shown) on the bottom side of the insulating blanket (i.e., the side face the ice mass). The grip elements may be in the form of spikes or hooks that can contact the ice mass or roof to help maintain positioning on a roof. In some cases, the grip elements may assist in the removal of the ice columns when the ice melting device is removed from a roof.

Referring still to FIG. 11, the device placement apparatus 202 can be configured to allow a user to install the ice melting device 10 to be raised and lowered to/from a roof from the ground level or from a position where the ice mass may be generally out of reach. The device placement apparatus 202 can include a harness 206, a pole 214, and a bracket 216.

The harness 206 can be configured to maintain the ice melting device 10 in a generally horizontal (i.e., level with the ground) orientation as the ice melting device is raised/lowered to/from a roof. The harness 206 can include a plurality of cables 218. The cables 218 can be coupled between a crossbar 220 and the eyelets 204 on the ice melting device 10. In the illustrated non-limiting example, the cable 218 can extend from the crossbar 220, through the holes 212 in the insulating blanket 208, to the eyelets 204 on the ice melting device 10.

The pole 214 can be a rigid elongate member (e.g., similar to a broom stick, or the like) such that the weight of the ice melting device 10 can be supported. In some non-limiting examples, the pole 214 can be that of a telescoping pole such that the length of the pole could be adjusted based on a height of the roof or the required reach to place the ice melting device 10. A bracket 216 can be coupled to a distal end 222 of the pole 214.

Figure 14:
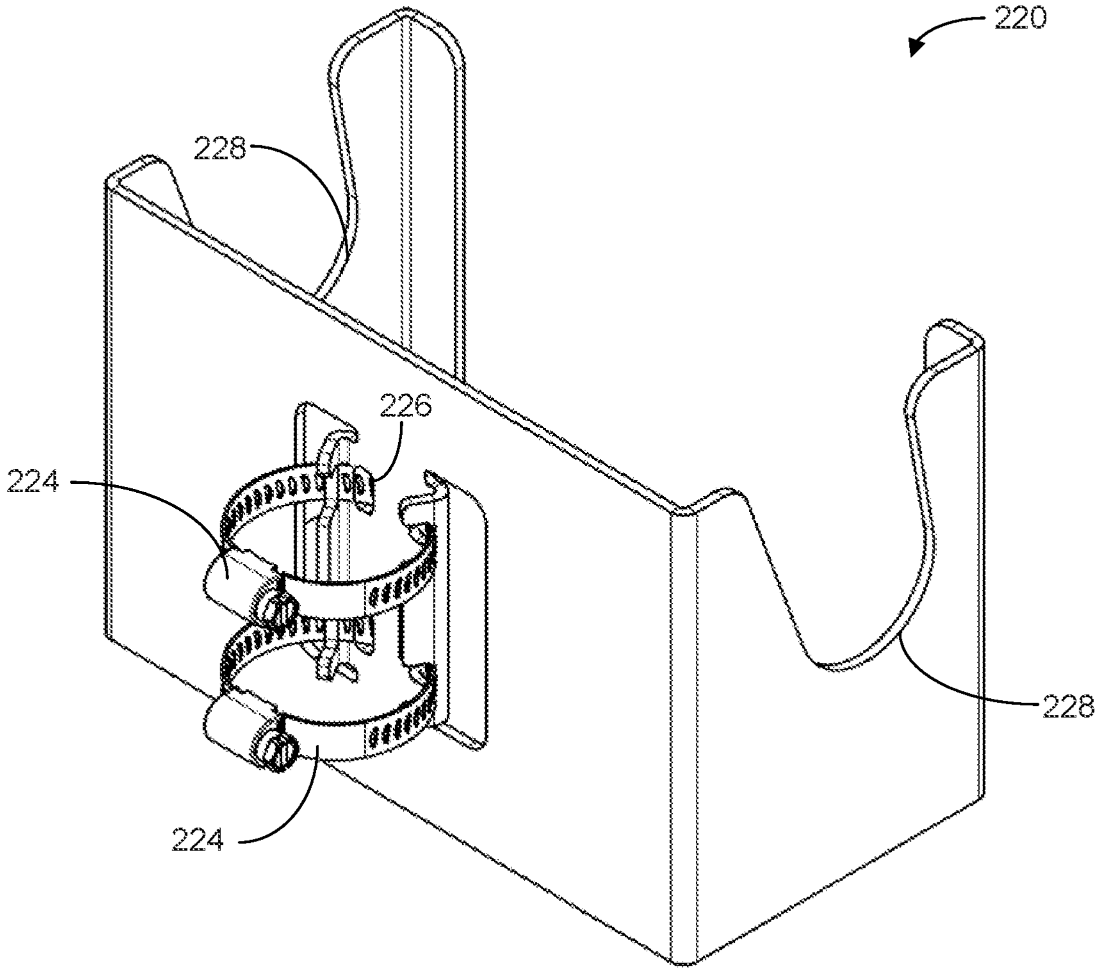
FIG. 14 is a perspective view of a bracket of the device placement apparatus of FIG. 11.

As best illustrated in FIG. 14, the bracket 216 can define a generally rectangular profile. The bracket 216 can be couple to the distal end 222 of the pole 214. In the illustrated non-limiting example, the bracket 216 is coupled to the pole 214 via a set of clamps 224. The clamps 224 can be routed through the bracket 216 via slots 226 formed in the bracket 216. The pole 214 can be inserted into the clamps 224 and then the clamps 224 can be tightened to secure the pole 214 to the bracket 216. The bracket 216 can also include a "C-shaped" cutout 228 formed on opposing sides thereof. The cutouts 228 can be configured to receive the crossbar 220.

During installation of the ice melting device 10, the ice melting device may be raised to be placed onto an ice mass on a roof or building structure. For example, a user may operate the pole 214 to engage the crossbar 220 of the harness 206. The crossbar 220 may then slide into the cutouts 228 on the bracket 216 and the user may begin to raise the ice melting device 10. As the ice melting device 10 is raised, the harness 206 will suspend and support the ice melting device 10. Once the ice melting device 10 is raised, the ice melting device 10 may be positioned to a desired area. For example, the user may manipulate the pole 214 to raise and place the ice melting device 10 in a desired position on a roof. Once the ice melting device 10 is in a desired position, the ice melting device 10 can be placed on a top side of an ice mass. For example, the user may manipulate the pole 214 to place the ice melting device 10 onto a top side of an ice mass on a roof or building structure and take the bracket 216 out of engagement with the crossbar 220 (e.g., by manipulation of the pole 214). In some non-limiting examples, the length of the cables 218 of the harness 206 can allow for the crossbar 220 to hang off an edge of a roof or side of a building structure such that the crossbar 220 can be easily reached for repositioning or removal of the ice melting device 10. Once the ice melting device 10 is placed upon the top side of the ice mass, power can be delivered to the ice melting device 10 (e.g., by plugging it in or via a controller applying power thereto) to begin to melt the ice mass such that the ice melting device 10 descends into the ice mass by forming channels into the ice mass. These steps may then be repeated to reposition or lower the ice melting device 10. It is to be understood by one of ordinary skill in the art that a manual installation or positioning method may be used, where a user may manually position or place an ice melting device, particularly those without provisions for a device placement apparatus.

In some non-limiting examples, particularly for larger embodiments of the ice melting device 10, multiple harnesses with multiple crossbars can be utilized such that multiple poles may be used to raise/lower an ice melting device. In some non-limiting examples, particularly for larger and/or heavy embodiments, a boom or hoist may be utilized to raise/lower the ice melting device.

Manufacturing

Figure 15:
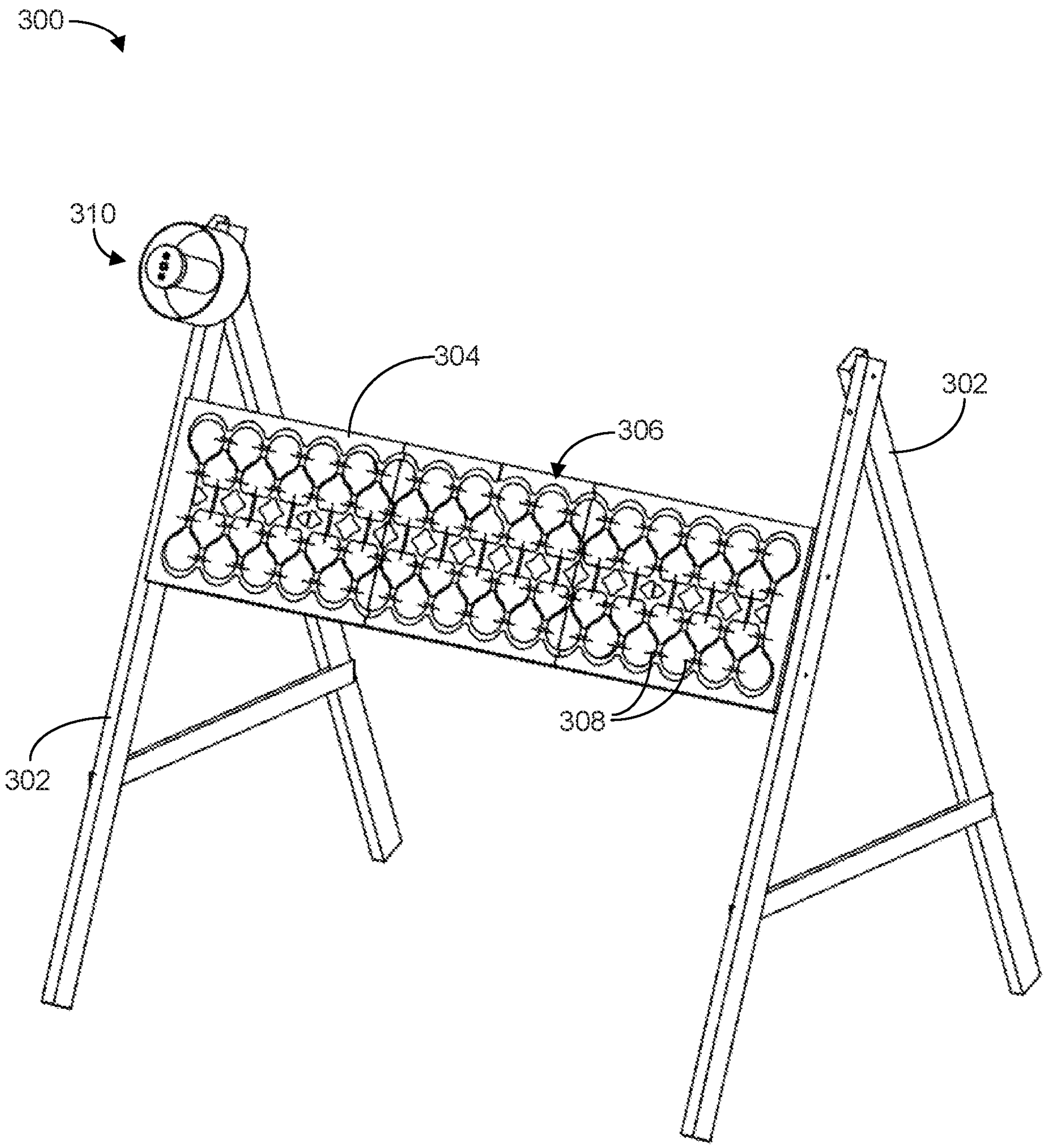
FIG. 15 is a manufacturing apparatus for forming a heating cable pattern of an ice melting device according to one aspect of the present disclosure.

Referring now to FIG. 15, a manufacturing apparatus 300 is illustrated. The manufacturing apparatus 300 can include a set of opposing "A-frames" 302 with an assembly board 304 arranged therebetween. The assembly board 304 can be coupled to the A-frames 302 such that the assembly board 304 can be positioned at an appropriate height for a technician to interact with the manufacturing apparatus 300.

The assembly board 304 can include a pattern 306 printed or carved thereon. The pattern 306 can resemble the pattern of the ice melting device such that a technician may use the pattern 306 as a guide when manufacturing the ice melting device 10. The assembly board 304 can also include a plurality of pegs 308 extending outward from the surface of the assembly board 304. The pegs 308 can be positioned adjacent to outer and inner edges of the pattern 306 to aid a technician in forming the arcs or curves of the particular pattern 306 of the ice melting device to be manufactured.

The manufacturing apparatus 300 can also include a cable reel 310 coupled to one of the A-frames 302. In one non-limiting example, the cable reel 310 can be used to store excess heating cable. In another non-limiting example, the heating cable can be fed from the cable reel 310 as a technician is forming the pattern 306 of the ice melting device.

OTHER EMBODIMENTS

Many other embodiments of the disclosed systems and configurations are contemplated. In the following figures, like reference numerals correspond to similar elements previously described herein. It is to be understood by one of ordinary skill in the art that various modifications are readily perceivable. For example, the size (e.g., length and width) of the ice melting device can be altered to accommodate various applications. For example, a small single family home may not require a large ice melting device, thus a smaller, easier to manage device may be used.

Figure 16:
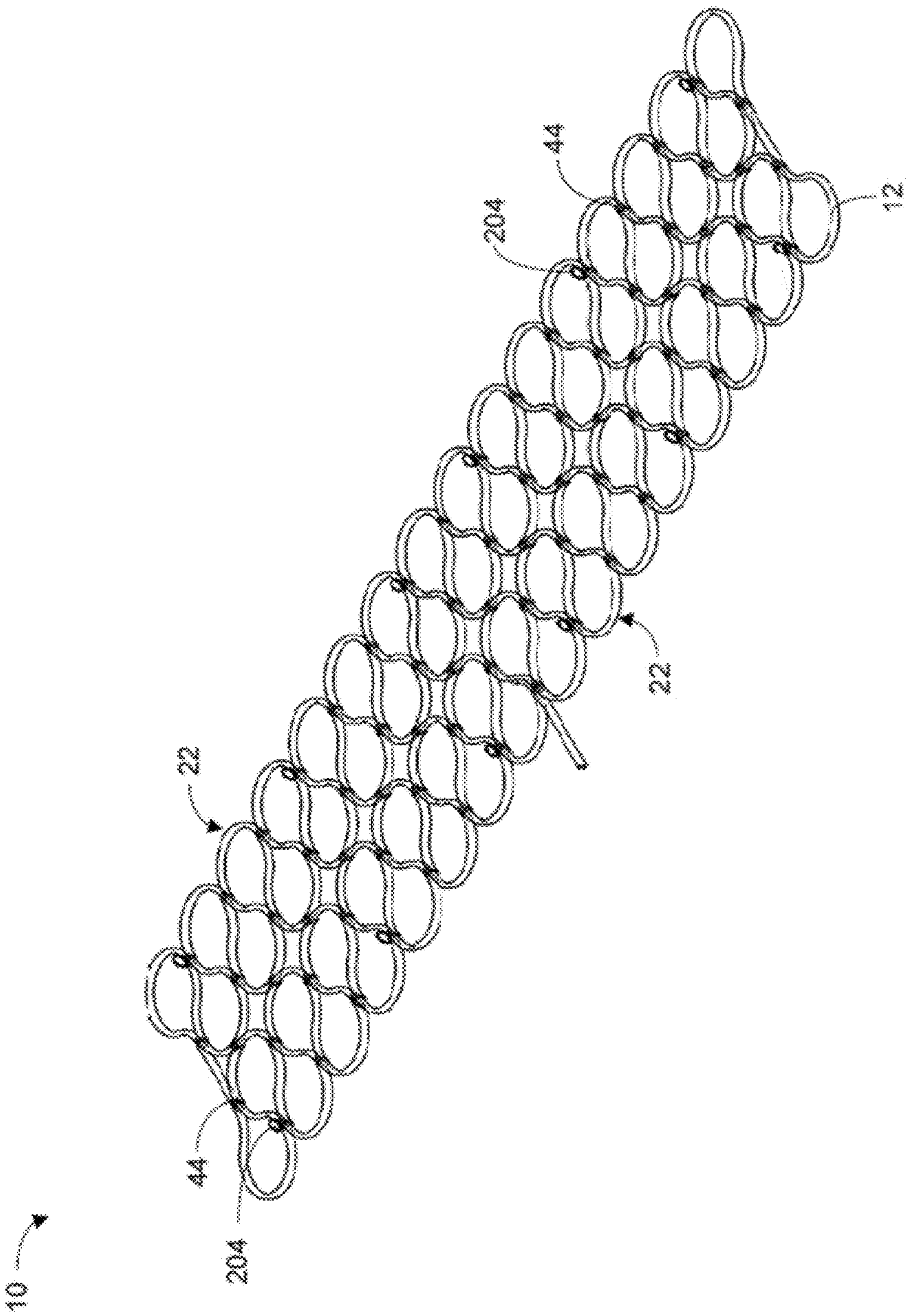
FIG. 16 is a perspective view of an ice melting device according to another aspect of the present disclosure.
Figure 17:
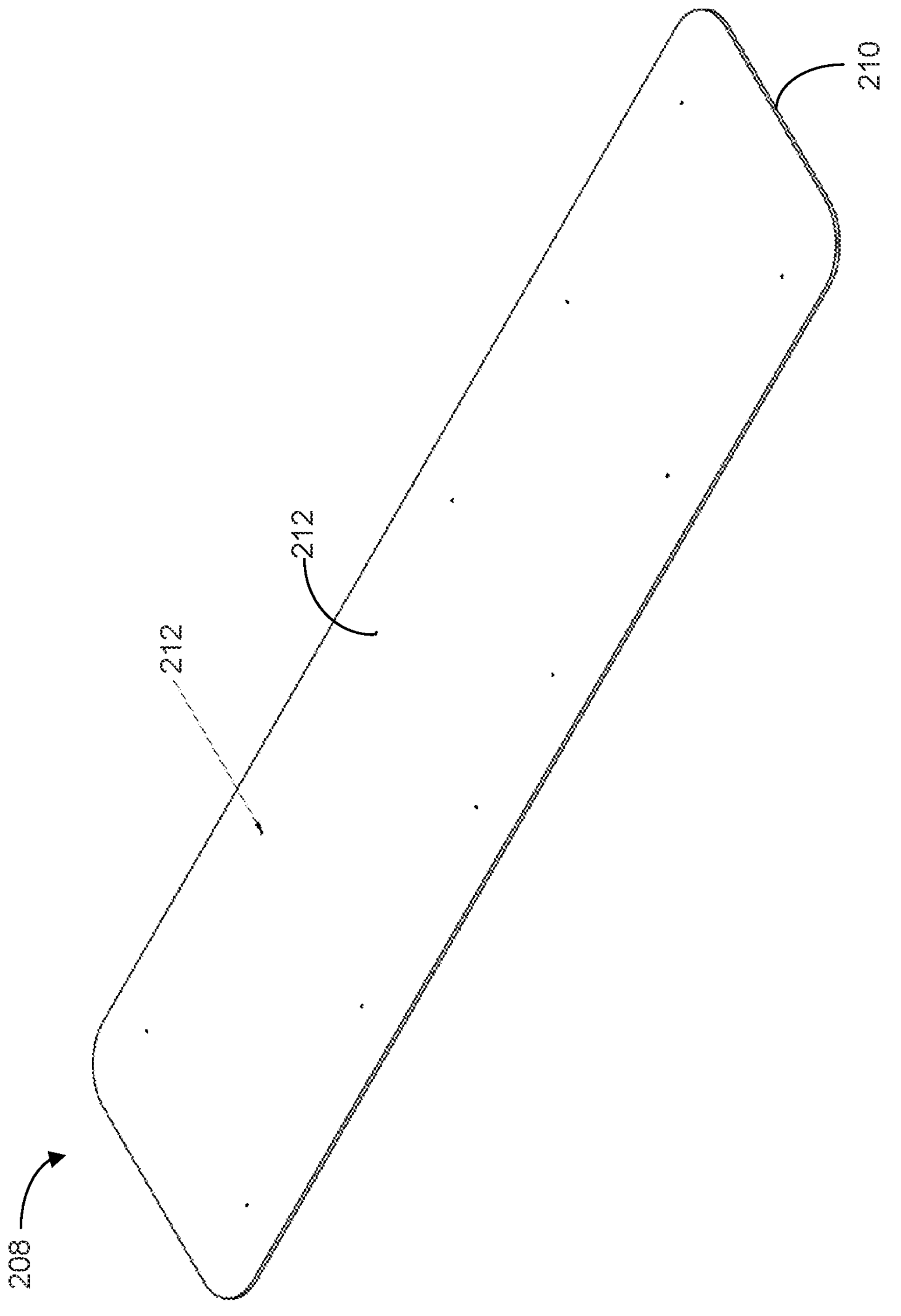
FIG. 17 is a perspective view of an insulating layer according to another aspect of the present disclosure.
Figure 18:
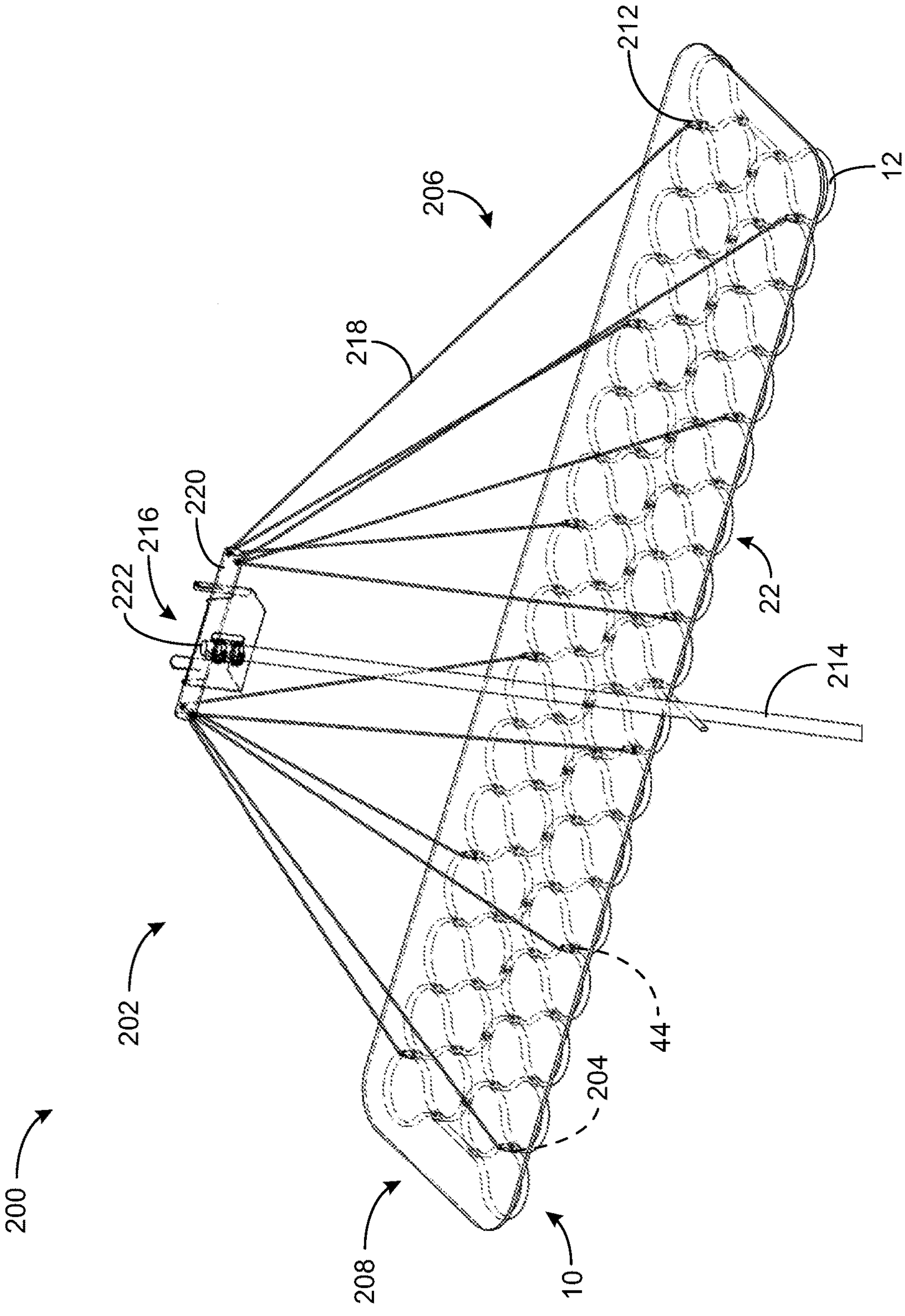
FIG. 18 is a perspective view of an ice melting kit according to another aspect of the present disclosure.

In another non-limiting example, the size of the ice melting device may be increased. This may be advantageous in commercial applications or for larger building structures. Such a configuration is illustrated in FIG. 16, where the ice melting device 10 can include a larger array of teardrop shapes, thereby forming a larger ice melting device to cover a larger area. Similarly, the insulation blanket 208 (FIG. 17) and the device placement apparatus 202 (FIG. 18) can be similarly modified to accommodate the larger ice melting device 10.

Figure 19:
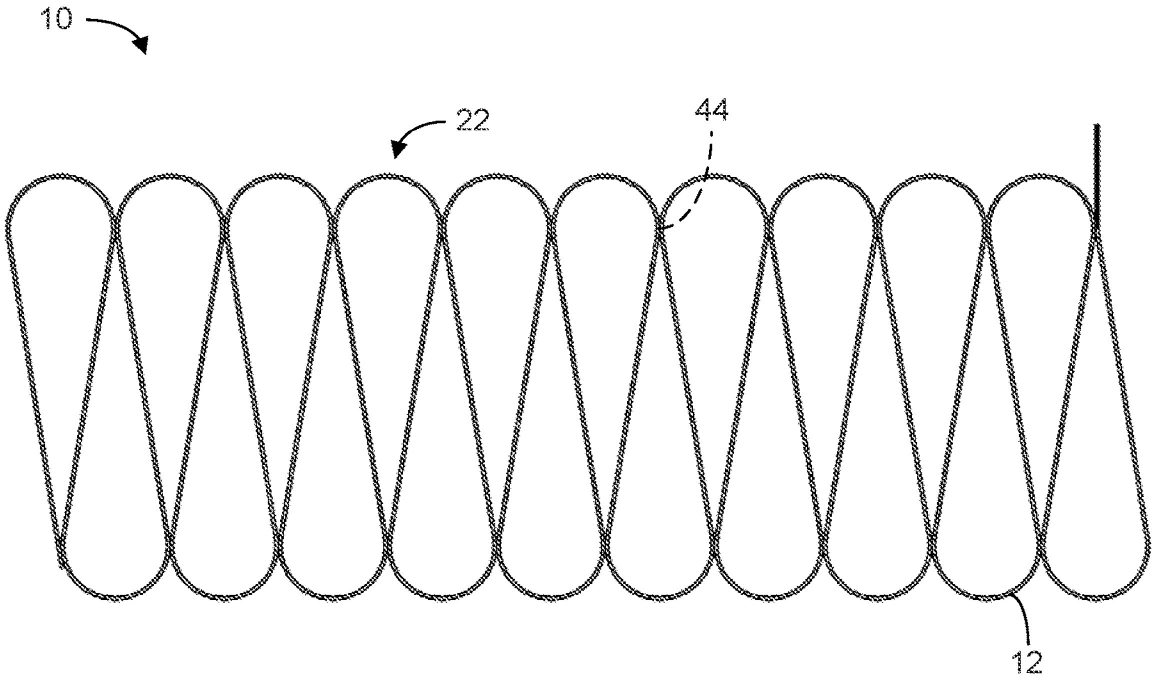
FIG. 19 is a top-down view of an ice melting device with an exemplary heating cable pattern configuration according to another one of the present disclosure.

In addition to varying the total dimensions of the ice melting device, other patterns of the heating cable of the ice melting device are also readily perceived by one of ordinary skill in the art. FIGS. 19-22 depict but a few non-limiting examples. As illustrated in FIG. 19, the heating cable 12 can be arranged in an elongated "teardrop" pattern. The teardrop pattern can be formed by a plurality of alternating clockwise and counter-clockwise arcs 22. In the illustrated non-limiting example, the arcs 22 can maintain an approximately constant radius for about 180° of curvature and the opposing arcs 22 can be adjoined by lengths of straight heating cable.

Figure 20:
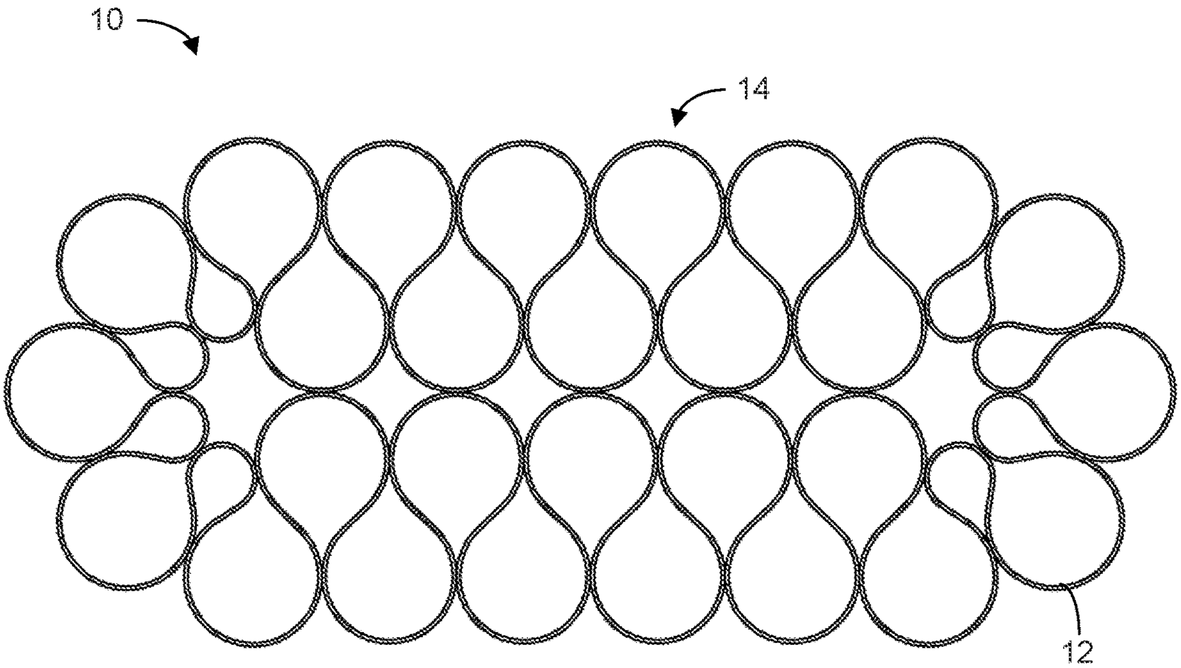
FIG. 20 is a top-down view of an ice melting device with another exemplary heating cable pattern configuration according to one aspect of the present disclosure.

As illustrated in FIG. 20, the heating cable 12 can be arranged in a "teardrop" pattern including various size teardrops. The teardrop patterned arrangement can be formed by a plurality of alternating clockwise and counter-clockwise arcs 22. In the illustrated non-limiting example, the arcs 22 throughout the ice melting device can vary. For example, some of the arcs 22 can maintain an approximately constant radius for about 300° or curvature, while other arcs 22 can maintain an approximately constant radius for about 350° of curvature.

Figure 21:
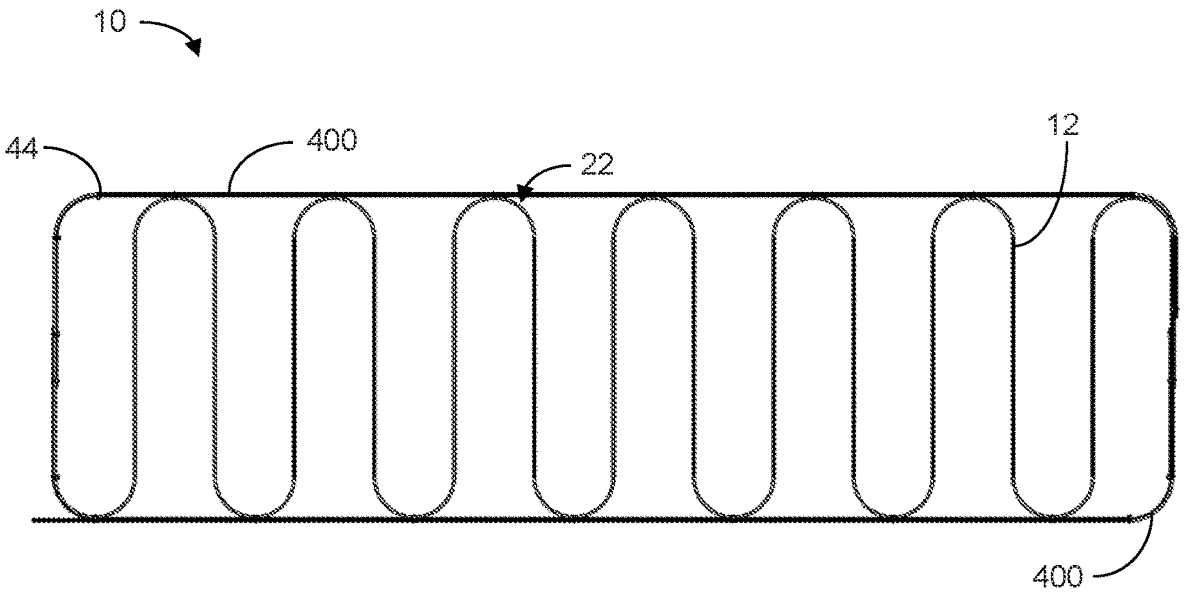
FIG. 21 is a top-down view of an ice melting device with yet another exemplary heating cable pattern configuration according to one aspect of the present disclosure.

As illustrated in FIG. 21, the heating cable 12 can be arranged in a sinuous pattern. The sinuous pattern can be formed by a series of arcs 22 adjoined by lengths of straight heating cable. In the illustrated non-limiting example, the arcs 22 maintain an approximately constant radius for about 180° of curvature. In some non-limiting examples, the heating cable 12 may also form a larger loop that wraps around a periphery of the sinuous pattern.

Figure 22:
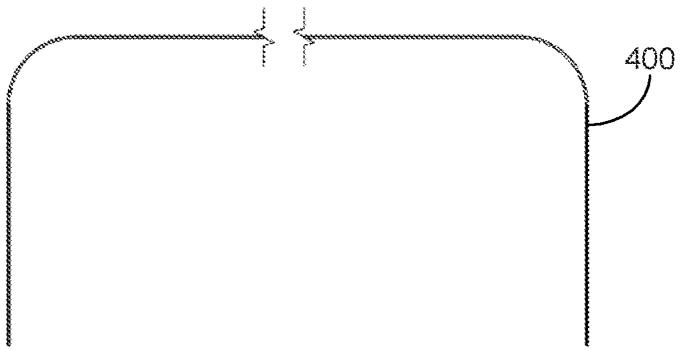
FIG. 22 is a top-down view of a secondary framework for the ice melting device of FIG. 21.

Optionally, as illustrated in FIGS. 21-22, a secondary framework 400 may be employed to maintain the heating cable 12 in a specific pattern to add rigidity to the ice melting device 10. In some non-limiting examples, if the secondary framework 400 extends outside or beyond the channels formed into the ice by the heating cable, then the secondary framework 400 may itself be heated to prevent restricting the entire ice melting device 10 from descending down through the ice mass. In some non-limiting examples, the secondary framework 400 may define a profile that is substantially the same as the profile or pattern formed by the heating cable 12. For example, the secondary framework 400 may duplicate the path of the heating cable. In the particular illustrated non-limiting example shown in FIG. 22, the secondary framework 400 may be split into one or more "U-shaped" portions. The secondary framework 400 can run along a periphery of the ice melting device 10.

This secondary framework 400 may be coupled to the heating cable 12, for example, with fasteners 44 previously described herein. In such a configuration, the ice melting device 10 would be placed onto the ice mass with the heating cables 12 facing towards the ice mass. As the heating cable 12 forms a channel in the ice mass, the secondary framework 400 would also descend within this channel. In another non-limiting example, the heating cable 12 may be in intimate contact with the secondary framework 400, which may allow for heat transfer from the heating cable 12 to the secondary framework 400, thereby allowing the secondary framework 400 itself to form a channel in the ice mass.

Further, although the present disclosure is directed towards addressing the issue of melting existing ice masses, the ice melting device could also be employed to address any mass of frozen liquid. For example, masses of snow or ice formed on vehicles, sidewalks, driveways, etc. In addition, the ice melting device could be employed to prevent the formation of ice masses. For example, by installing it onto a roof and leaving it installed for long periods of time.

It is to be understood by one of ordinary skill in the art that the ice melting device disclosed herein could also be utilized in heating driveways, sidewalks, floors, or floor/surface structures from within. For example, the ice melting device 10 can be embedded within concrete or blacktop to heat the concrete or blacktop from within to melt snow or ice that may form on a surface thereof. Similarly, the ice melting device may be utilized in situations where flooring heating is desired, for example, in a home or commercial building to provide a heated floor. Here, the rigidity of the manufactured arrangement means that the device can be simply laid into a space in which concrete is to be poured without requiring any additional manual activities to fasten the heating elements into a planar shape as is required in many heated floor arrangements. In heated floor, driveway and other similar arrangements the overall width and length dimensions of the heating configuration can be substantially larger than in typical roof melting systems. For instance, in these applications the width and height dimensions may be as large as tens or even hundreds of feet.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims.

What is claimed is:

1. An ice melting device comprising:

a heating cable formed in a patterned arrangement comprising a plurality of arcs, at least a portion of the patterned arrangement includes a repeating series of alternating arcs, the series of alternating arcs including a first arc formed in a clockwise direction and a second arc formed in a counter-clockwise direction;

wherein each arc formed in the clockwise direction is coupled to and contacts at least one adjacent arc formed in the clockwise direction and each arc formed in the counter-clockwise direction is coupled to and contacts at least one adjacent arc formed in the counter-clockwise direction; and wherein the patterned arrangement has a first surface and a second surface opposite the first surface, the cable forms openings that extend from the first surface to the second surface, the openings unobstructed by melting device components adjacent the second surface, and, wherein, the second surface faces downward in an operating ice melting orientation.

2. The device of claim 1, wherein the heating cable forming the patterned arrangement is formed from a single, continuous heating cable.

3. The device of claim 1, wherein each arc among the plurality of arcs forms a teardrop-shape.

4. The device of claim 1, wherein each arc forms a substantially constant radius throughout a range of between 260 degrees and 320 degrees.

5. The device of claim 1, wherein the second arc mirrors the first arc.

6. The device of claim 1, wherein each arc defines a substantially constant radius for greater than 180 degrees of curvature.

7. The device of claim 6, wherein the constant radius is between about 1 inch to about 15 inches.

8. The device of claim 1, wherein adjacent arc sections are coupled to each other via cable ties.

9. The device of claim 1, further comprising an electrical plug in electrical communication with a first end of the heating cable.

10. The device of claim 9, further comprising a non-heated electrical lead coupled between the first end of the heating cable and the electrical plug.

11. The device of claim 1, wherein the heating cable is a self-regulating heating cable configured to maintain a predetermined operating temperature.

12. The device of claim 11, wherein the self-regulating heating cable includes a set of parallel bus wires sheathed in an electrically conductive material.

13. The device of claim 1, wherein the heating cable defines a rectangular or pill-shaped cross section having a long dimension and a short dimension perpendicular to the long dimension, and wherein an inner surface of each arc defines an inner radius of the arc wherein the inner surface of each arc is formed by a side of the cable that extends along the long dimension of the cross section.

14. An ice melting kit including the device of claim 1, the ice melting kit including:

an insulating layer arranged above the heating cable and configured to cover the first surface of the patterned arrangement.

15. The kit of claim 14, wherein the insulating layer is configured to extend beyond a periphery of the patterned arrangement.

16. The kit of claim 14, further including a harness including a plurality of cables, wherein each cable among the plurality of cables is coupled between the heating cable and a crossbar, such that raising the crossbar also raises the ice melting device via support from the plurality of cables.

17. The kit of claim 16, wherein the insulating layer includes a plurality of holes configured to receive the plurality of cables, such that the insulating layer is arranged between the crossbar and the heating cable.

18. The kit of claim 16, further including a pole with a bracket coupled to an end of the pole, the bracket including cutouts configured to engage the crossbar.

19. The device of claim 1, wherein the contacting portions of adjacent arcs formed in the clockwise direction are held together via cable ties and the contacting portions of adjacent arcs formed in the counter-clockwise direction are held together via cable ties.

20. An ice melting device comprising:

a continuous heating cable including a first end and second end, the continuous heating cable forming a pattern of a plurality of teardrop-shaped arcs between the first and second end of the continuous heating cable to form a planar structure having first and second opposite surfaces, from the continuous heating cable, wherein the heating cable defines a rectangular or pill-shaped cross section having a long dimension and a short dimension perpendicular to the long dimension; and wherein an inner surface of each arc defines an inner radius of the arc wherein the inner surface of each arc is formed by a side of the cable that extends along the long dimension of the cross section and wherein each are among the plurality of teardrop-shaped arcs is in contact with at least one adjacent arc, wherein the cable forms openings that extend from the first surface to the second surface, the openings unobstructed by melting device components adjacent the first and second surfaces.

21. The device of claim 19 wherein each arc forms a constant radius within a range of between 260 degrees and 320 degrees.

22. An ice melting device comprising:

a heating cable including an outer surface;

wherein the cable is formed in a patterned arrangement comprising a plurality of arcs;

wherein an outer surface of each arc forms a constant radius within a range between 260 degrees and 320 degrees;

wherein the arcs are secured together so that the outer surface of each arc contacts the outer surface of at least one other arc;

wherein the arcs form a single layer so that the arcs do not overlap each other; and wherein the patterned arrangement has a first surface and a second surface opposite the first surface, the cable forms openings that extend from the first surface to the second surface, the openings unobstructed by melting device components adjacent the first and second surfaces.

* * * * *